(12) United States Patent
Irie et al.

(10) Patent No.: US 7,174,635 B2
(45) Date of Patent: Feb. 13, 2007

(54) METHOD FOR PRODUCING A COLUMNAR MEMBER CONTAINER

(75) Inventors: Tohru Irie, Nagoya (JP); Akinobu Morikawa, Nishikamo-gun (JP); Yukinori Suzuki, Nagoya (JP)

(73) Assignee: Sango Co., Ltd., Nagoya (JP)

( * ) Notice: Subject to any disclaimer, the term of this patent is extended or adjusted under 35 U.S.C. 154(b) by 213 days.

(21) Appl. No.: 11/015,662

(22) Filed: Dec. 20, 2004

(65) Prior Publication Data
US 2005/0138786 A1 Jun. 30, 2005

(30) Foreign Application Priority Data
Dec. 26, 2003 (JP) .............................. 2003-434996

(51) Int. Cl.
B21D 51/16 (2006.01)
B23P 19/00 (2006.01)

(52) U.S. Cl. ............................ 29/890; 29/446; 29/464; 29/466; 29/468; 29/505; 29/508; 29/525

(58) Field of Classification Search .................. 29/890, 29/464, 466, 468, 469, 469.5, 505, 508, 515, 29/516, 446, 525
See application file for complete search history.

(56) References Cited

U.S. PATENT DOCUMENTS

| | | | | |
|---|---|---|---|---|
| 5,105,516 A | * | 4/1992 | Enomoto et al. | 29/281.5 |
| 5,724,735 A | * | 3/1998 | Ickes et al. | 29/890 |
| 5,960,529 A | * | 10/1999 | Haesemann et al. | 29/516 |
| 6,242,071 B1 | * | 6/2001 | Yamada et al. | 428/116 |
| 6,381,843 B1 | * | 5/2002 | Irie et al. | 29/890 |
| 6,463,655 B1 | * | 10/2002 | Williams et al. | 29/890.08 |
| 6,484,397 B1 | * | 11/2002 | Collins et al. | 29/890 |
| 6,532,659 B1 | * | 3/2003 | DeSousa et al. | 29/890 |
| 6,591,498 B2 | * | 7/2003 | Irie et al. | 29/890 |
| 6,793,895 B1 | * | 9/2004 | Wieres et al. | 422/177 |

(Continued)

FOREIGN PATENT DOCUMENTS

EP  0 982 480 A2  3/2000

(Continued)

OTHER PUBLICATIONS

U.S. Appl. No. 10/637,677, filed Aug. 11, 2003, Irie et al.

Primary Examiner—Essama Omgba
(74) Attorney, Agent, or Firm—Oliff & Berridge, PLC

(57) ABSTRACT

A method includes the steps of (1) wrapping a shock absorbent member around a columnar member, (2) supporting one end portion of a cylindrical housing on a support member, (3) arranging the columnar member in a cylindrical guide member formed with the tapered portion inside thereof, (4) inserting the shock absorbent member and the columnar member into the cylindrical housing through the tapered portion, (5) pressing a pushing member to the columnar member so as to be moved along the longitudinal axis thereof relative to the cylindrical housing, to accommodate the shock absorbent member and the columnar member in the cylindrical housing, (6) moving the support member and a shrinking mechanism relative to each other, and (7) actuating the shrinking mechanism to reduce the diameter of a part of the cylindrical housing.

10 Claims, 25 Drawing Sheets

U.S. PATENT DOCUMENTS

| | | | |
|---|---|---|---|
| 6,824,744 B1 * | 11/2004 | Stoepler et al. | 422/179 |
| 6,954,988 B2 * | 10/2005 | Mayfield | 29/890 |
| 2002/0095787 A1 * | 7/2002 | Irie et al. | 29/890 |
| 2002/0096225 A1 * | 7/2002 | Ishizu et al. | 138/114 |
| 2002/0172626 A1 * | 11/2002 | Lesher et al. | 422/179 |
| 2002/0189097 A1 * | 12/2002 | Collins et al. | 29/890 |
| 2003/0000088 A1 * | 1/2003 | Mayfield | 29/890 |
| 2003/0140494 A1 * | 7/2003 | Hardesty | 29/890 |
| 2003/0140495 A1 * | 7/2003 | Hardesty et al. | 29/890 |
| 2004/0009106 A1 * | 1/2004 | Galligan et al. | 422/180 |
| 2004/0237305 A1 * | 12/2004 | Morikawa et al. | 29/896.62 |
| 2005/0005446 A1 * | 1/2005 | Mayfield | 29/890 |
| 2006/0085980 A1 * | 4/2006 | Mayfield | 29/890 |
| 2006/0150382 A1 * | 7/2006 | Martin | 29/281.3 |

FOREIGN PATENT DOCUMENTS

| | | |
|---|---|---|
| EP | 1 074 704 A2 | 2/2001 |
| EP | 1 344 911 A1 | 9/2003 |
| JP | A 11-320723 | 11/1999 |
| JP | A 2001-526115 | 12/2001 |
| JP | A 2002-263764 | 9/2002 |
| JP | A 2003-225834 | 8/2003 |
| JP | A 2003-286836 | 10/2003 |
| WO | WO 99/32215 | 7/1999 |
| WO | WO 02/095198 A1 | 11/2002 |

* cited by examiner

METHOD FOR PRODUCING A COLUMNAR MEMBER CONTAINER

BACKGROUND OF THE INVENTION

1. Field of Invention

The present invention relates to a method for producing a columnar member container for holding a columnar member in a cylindrical housing, with a shock absorbent member wrapped around the columnar member, and more particularly to a method for producing a catalytic converter for holding a catalyst substrate with a shock absorbent mat wrapped around it in a cylindrical housing.

2. Description of Related Arts

A container for holding a columnar member having a honeycomb structure and functioning as a fluid filter in a metallic cylindrical housing through a shock absorbent member has been used for a fluid treatment device, and provided for purifying various fluids. In an exhaust system of an automotive vehicle, for example, a catalytic converter, a diesel particulate filter (abbreviated as DPF) and the like have been used, and equipped with a fragile ceramic columnar member of a honeycomb structure, for a catalyst substrate, filter or the like (hereinafter, referred to as catalyst substrate). The honeycomb columnar member is held in the metallic cylindrical housing through the shock absorbent member such as a ceramic mat or the like, to constitute the fluid treatment device, an example of which is the catalytic converter. In order to produce the container for holding the columnar member such as the catalytic converter, generally employed is such a method for wrapping the shock absorbent member around the catalyst substrate, and stuffing them into the cylindrical housing, with the shock absorbent member being compressed.

For example, Japanese Patent Laid-open Publication (PCT) No. 2001-526115 proposes a method for producing a catalytic converter for use in an internal combustion engine, by wrapping a ceramic shock absorbent mat as a shock absorbent member around an outer periphery of a catalyst substrate, which are loosely inserted into a cylindrical member or stuffed (pressed) into it, and thereafter reducing the diameter of the outer periphery of the cylindrical member by means of shrinking dies, to form them in a body. In Japanese Patent Laid-open Publication No. 2002-263764, there is disclosed an apparatus for carrying a honeycomb member for use in the catalytic converter from an inserting mechanism to a drawing mechanism by means of an automatic carrying machine, instead of a hand carrying system.

In Japanese Patent Laid-open Publication No. 2003-286836, there is disclosed a method for compressing a shock absorbent mat wrapped around a catalyst substrate by a pushing member in a direction perpendicular to the longitudinal axis of the catalyst substrate, measuring a stroke when the predetermined pressure is obtained, and reducing the diameter of the cylindrical member to provide an inner diameter corresponding to the measured pressure. According to Japanese Patent Laid-open Publication No. 2003-225834, there is disclosed a method for inserting the catalyst substrate into the cylindrical member, in order not to place a longitudinal axis of the catalyst substrate oblique to or offset from the longitudinal axis of the cylindrical member. In Japanese Patent Laid-open Publication No. 11-320723, there is disclosed a catalyst substrate formed in a honeycomb structural member with hexagonal cells. And, International publication No. WO 02/095198 A1 discloses an apparatus for manufacturing a catalytic converter which is provided with a plurality of pressure roller assemblies 64 for compressing mat material and a tapered lead-in members 66, in parallel with each other.

In a co-pending U.S. patent application Ser. No. 10/637,677, filed on Aug. 11, 2003 by two of the inventors in the present application, proposed is a method of producing a container for holding a fragile substrate in a cylindrical housing with a shock absorbent member wrapped around the substrate, with an appropriate holding force determined on the basis of frictional force between the shock absorbent member and the one with the smaller coefficient of friction out of the substrate and the cylindrical housing. The method comprises the steps of inserting the substrate with the shock absorbent member wrapped around the substrate, into the cylindrical housing loosely, applying an axial load to the substrate so as to move the substrate along a longitudinal axis of the cylindrical housing by a predetermined distance, monitoring the axial load applied to the substrate, and reducing a diameter of at least a part of the cylindrical housing with the substrate held therein along the longitudinal axis of the cylindrical housing, with the shock absorbent member being compressed, to such an extent that the axial load equals a predetermined value.

According to the prior method as disclosed in Japanese Patent Laid-open Publication (PCT) No. 2001-526115, however, although nothing has been described about a carrying system of the finished catalytic converter, when a worker will carry it to a shrinking machine by hand, for example, the position of the catalyst substrate and/or shock absorbent mat relative to the cylindrical member (housing) will be shifted while it is being carried. If the diameter of the cylindrical member is reduced in that state, such a catalytic converter with the catalyst substrate held at an inappropriate position in the cylindrical member along the axis thereof will be produced. Also, the worker is engaged in the carrying process of intermediate products under production, miss-assembling might be caused, and it will take time to carry them, thereby to prolong a manufacturing time in total. According to the inserting mechanism as disclosed in Japanese Patent Laid-open Publication No. 2002-263 764, a cylinder body 3 served as the cylindrical member is secured to a fixed clamp 61, and a honeycomb member 1 served as the catalyst substrate is held by an inserting plunger 62 to be inserted into the cylinder body 3. Therefore, although the honeycomb member 1 is positioned appropriately relative to the cylinder body 3, when it is carried to a drawing mechanism 80, it will be carried in a free state, with the fixed clamp and the inserting plunger retracted. As a result, the positions of the honeycomb member 1 and/or mat 2 relative to the cylinder body 3 will be shifted due to vibration of the automatic carrying machine, and impacts or the like caused when the carrying process is initiated or terminated, so that the problem as described before will not be solved. According to the apparatus as disclosed in the International publication No. WO 02/095198 A1, although the pressure roller assemblies 64 and tapered lead-in members 66 are paced in parallel with each other, a spinning process is provided for reducing the diameter of an outer tube at a later stage separately from the inserting process as shown in FIG. 7 or FIG. 8 of that International publication.

SUMMARY OF THE INVENTION

Accordingly, it is an object of the present invention to provide a method for producing a container for holding a columnar member in a cylindrical housing, with a shock absorbent member wrapped around the columnar member, which method is capable of achieving a series of steps including a step of inserting the shock absorbent member and columnar member into the cylindrical housing, and a step of reducing the diameter of the cylindrical housing, in sequence.

In accomplishing the above and other objects, the method comprises the steps of wrapping a shock absorbent member around the columnar member; supporting one end portion of one of a cylindrical housing and the columnar member, on a support member; arranging the other one of the cylindrical housing and the columnar member in a cylindrical guide member formed with a tapered portion inside thereof and placed on the same axis as a longitudinal axis of the support member; inserting the shock absorbent member and the columnar member into the cylindrical housing through the tapered portion of the guide member; pressing a pushing member to the other one of the cylindrical housing and the columnar member so as to be moved along a longitudinal axis thereof relative to each other, to accommodate the shock absorbent member and the columnar member in the cylindrical housing; moving the support member and a shrinking mechanism for reducing a diameter of a part of the cylindrical housing, relative to each other, with the one end portion of one of the cylindrical housing and the columnar member being supported on the support member, to move the cylindrical housing, shock absorbent member and columnar member in a body, to be placed at a certain position relative to the shrinking mechanism; and actuating the shrinking mechanism to reduce the diameter of the part of the cylindrical housing.

In the method as described above, therefore, the method for producing the columnar member container may be embodied as follows.

As a first embodiment, the method comprises the steps of (1) wrapping the shock absorbent member around the columnar member, (2) supporting one end portion of the cylindrical housing on the support member, (3) arranging the columnar member in the cylindrical guide member formed with the tapered portion inside thereof and placed on the same axis as the longitudinal axis of the support member, (4) inserting the shock absorbent member and the columnar member into the cylindrical housing through the tapered portion of the guide member, (5) pressing the pushing member to the columnar member so as to be moved along the longitudinal axis thereof relative to the cylindrical housing, to accommodate the shock absorbent member and the columnar member in the cylindrical housing, (6) moving the support member and the shrinking mechanism for reducing the diameter of the part of the cylindrical housing, relative to each other, with the one end portion of the cylindrical housing being supported on the support member, to move the cylindrical housing, shock absorbent member and columnar member in a body, to be placed at the certain position relative to the shrinking mechanism, and (7) actuating the shrinking mechanism to reduce the diameter of the part of the cylindrical housing.

Next, as a second embodiment, the method comprises the steps of (1) wrapping the shock absorbent member around the columnar member, (2) supporting one end portion of the columnar member on the support member, (3) arranging the cylindrical housing in the cylindrical guide member formed with the tapered portion inside thereof and placed on the same axis as the longitudinal axis of the support member, (4) inserting the shock absorbent member and the columnar member into the cylindrical housing through the tapered portion of the guide member, (5) pressing the pushing member to the cylindrical housing so as to be moved along the longitudinal axis thereof relative to the columnar member, to accommodate the shock absorbent member and the columnar member in the cylindrical housing, (6) moving the support member and the shrinking mechanism for reducing the diameter of the part of the cylindrical housing, relative to each other, with the one end portion of the columnar member being supported on the support member, to move the cylindrical housing, shock absorbent member and columnar member in a body, to be placed at the certain position relative to the shrinking mechanism, and (7) actuating the shrinking mechanism to reduce the diameter of the part of the cylindrical housing.

In the method as described above, preferably, the support member and the shrinking mechanism are placed on a common axis to face each other, and moved in a direction close to each other, to insert the shock absorbent member and the columnar member into the cylindrical housing, and reduce the diameter of the cylindrical housing, in sequence.

Preferably, the guide member is retracted from a path for inserting the shock absorbent member and the columnar member into the cylindrical housing, after the shock absorbent member and the columnar member were inserted into the cylindrical housing.

The shrinking mechanism may include a plurality of segments to provide a tapered outer peripheral surface, and at least a clamping member having a tapered inner peripheral surface to slide in contact with the tapered outer peripheral surface of the segments, and the clamping member may be moved along the longitudinal axis of the cylindrical housing, to actuate the segments in a radial direction toward the longitudinal axis of the cylindrical housing.

In the methods as described above, the step of inserting the shock absorbent member and the columnar member into the cylindrical housing includes the step of stuffing the shock absorbent member and the columnar member into the cylindrical housing.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
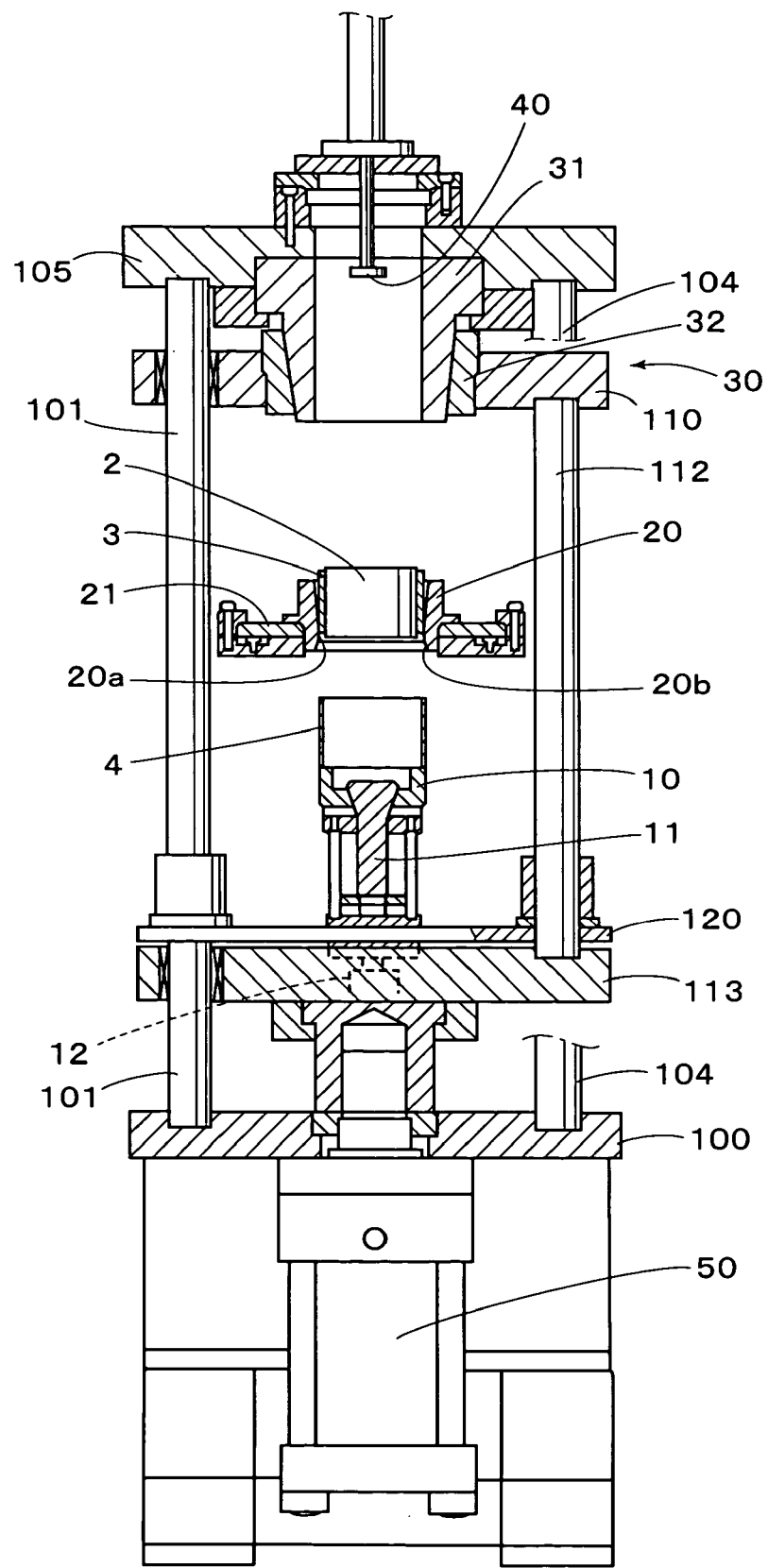
FIG. 1 is a sectional view showing a part of an apparatus for producing a catalytic converter as an embodiment of an apparatus for use in a method for producing a columnar member container according to the present invention.
Figure 10:
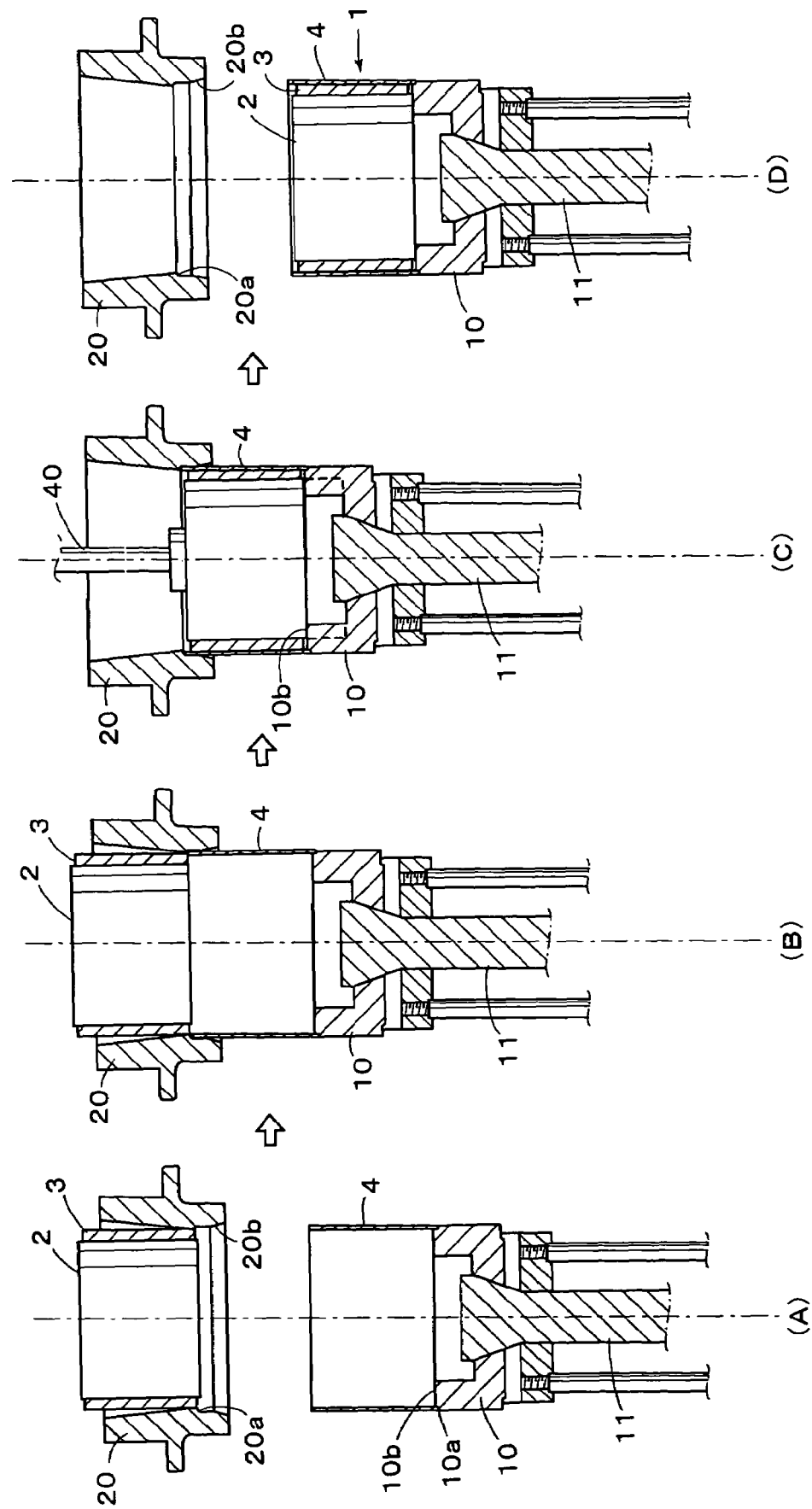
FIG. 10 is an enlarged sectional view showing a series of steps performed by the apparatus for producing the catalytic converter according to an embodiment of the present invention.
Figure 11:
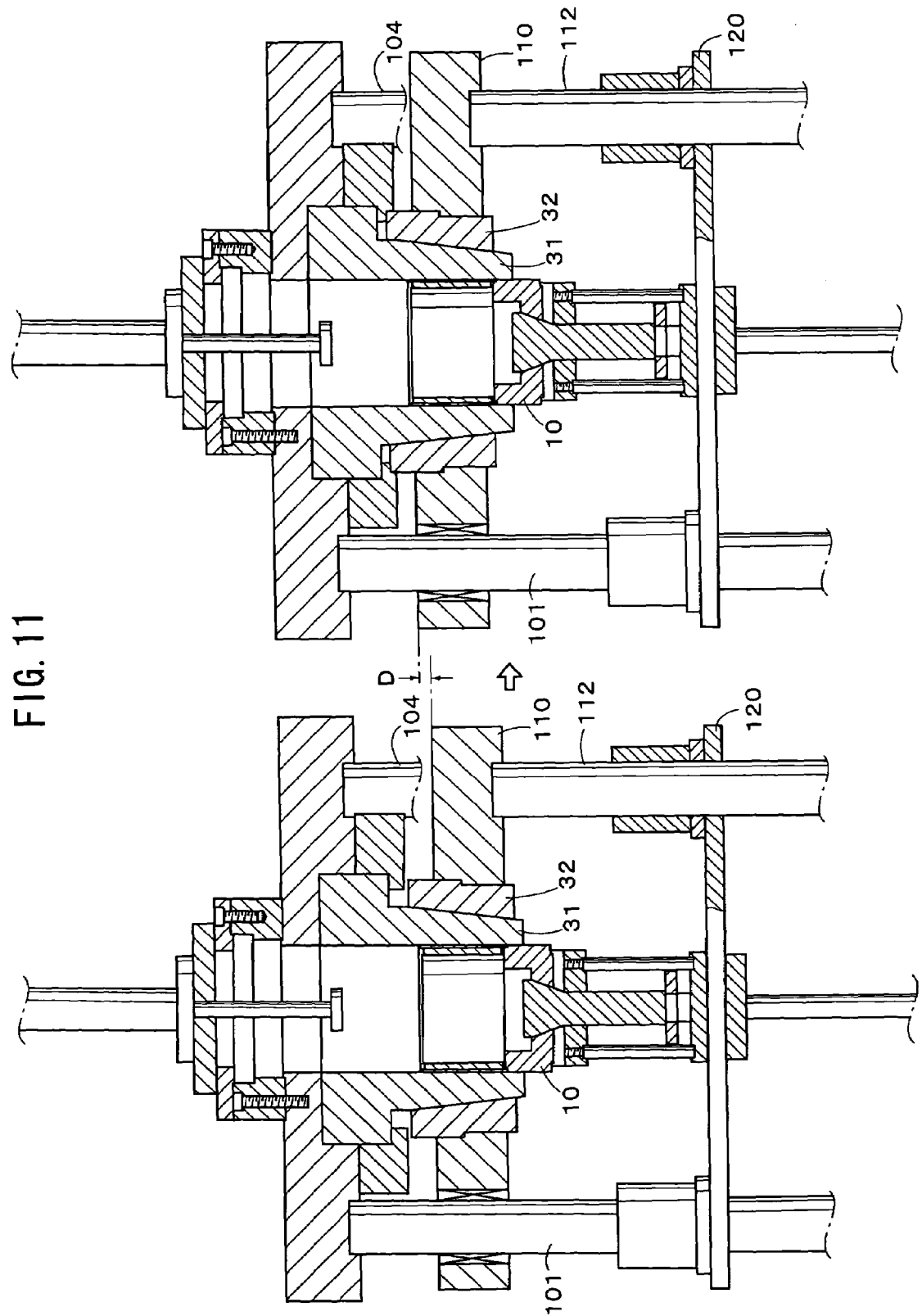
FIG. 11 is an enlarged sectional view showing a series of steps performed by the apparatus for producing the catalytic converter according to an embodiment of the present invention.

Referring to FIG. 1, there is schematically illustrated an overall structure of an apparatus for use in a method for producing a container for holding a columnar member in a cylindrical housing with a shock absorbent member wrapped around the columnar member, according to the present invention. As an embodiment of the method, a method for producing a catalytic converter for use in an exhaust gas purifying system will be explained with reference to FIGS. 1–12, wherein FIGS. 1–9 illustrate sectional views for each process performed by means of an apparatus for producing a catalytic converter, and FIGS. 10 and 11 illustrate enlarged sectional views for each process. At the outset, an overall structure of the apparatus for producing the catalytic converter will be explained, with reference to FIG. 1, and FIG. 2 sectioned along A—A line in FIG. 1.

On a base table 100, a base plate 105 is mounted through rods 101–104, and plates 110 and 113 are mounted through rods 111 and 112. The plates 110 and 113 are mounted to be slidable along the rods 111 and 112, with a certain distance being spaced between them, and a plate 120 is mounted to be slidable along the rods 111 and 112. A support member 10 is mounted on the plate 120. The support member 10 and plate 120 are actuated by an air cylinder 12 to be movable up and down (vertically), and the base table 100 is actuated by an actuator 50 to be movable vertically. Preferably, the support member 10 is divided into a plurality of segments (two segments in the present embodiment) along its periphery, and placed around a normal axis, i.e., longitudinal axis of a cone portion 11, to be expanded in a radial direction. The cone portion 11 is disposed to be movable vertically, through the center of the support member 10. The cone portion 11 is formed with a tapered outer peripheral surface, so that when the cone portion 11 is moved downward in FIG. 1, the segments of the support member 10 are moved outward in a radial direction, whereas if the cone portion 11 is moved upward in FIG. 1, the segments of the support member 10 are moved toward the longitudinal axis of the cone portion 11.

Above the support member 10, there is disposed a cylindrical guide member 20 which is formed with an annular step portion 20a and a tapered portion 20b, and which can be placed on the same axis as the support member 10. As can be seen from FIGS. 1 and 2, the guide member 20 is fixed on a table 21 which is movable in the horizontal direction, and arranged to be capable of being retracted outward from the apparatus (lateral direction in the present embodiment) together with the table 21. On the plate 110 mounted above the guide member 20, is supported a shrinking mechanism 30 as will be described later in detail. And, on the base plate 105, a pushing member 40 is supported to penetrate the shrinking mechanism 30 to be movable through it.

According to the apparatus as described above, an end portion of a cylindrical member or cylindrical housing 4 is supported on the support member 10. As enlarged in FIG. 10(A), an annular step portion 10a is formed at a peripheral end portion of the support member 10, to support the cylindrical housing 4 at the inner side thereof, as well as its longitudinal end. Then, a catalyst substrate 2 with a shock absorbent mat 3 wrapped around it is placed in the guide member 20. The shock absorbent mat 3, which serves as the shock absorbent member of the present invention, is wrapped around the catalyst substrate 2, which serves as the columnar member of the present invention, as shown in FIG. 10(A), and fixed by an inflammable tape if necessary. In this respect, it is preferable to use a conventional wrapping manner by forming in advance an extension and a recess (not shown) on the opposite ends of the shock absorbent mat 3, respectively, and wrapping the shock absorbent mat 3 around the catalyst substrate 2, with the extension and recess engaged with each other.

According to the present embodiment, the catalyst substrate 2 is a ceramic honeycomb member with a honeycomb structure having thin walls formed between neighboring cells (passages). However, the catalyst substrate 2 may be made of metal, i.e., its material and method for producing it are not limited herein. The shock absorbent mat 3 is constituted by an alumina mat which will be hardly expanded by heat, in this embodiment, but may be employed a vermiculite mat having a thermal expansion property, or a combination of those mats. Also, may be employed an inorganic fiber mat without binder impregnated. Or, as for the shock absorbent mat, a wire-mesh with thin steal wires meshed, or the like may be used, and it may be combined with a ceramic mat. In addition, those may be used in combination with an annular metallic retainer, a seal ring made of wire mesh, or the like. Furthermore, a shock absorbent mat formed in a cylindrical shape may be used, so that by simply inserting the catalyst substrate 2 into the cylindrical mat, the shock absorbent mat comes to be placed in its mounted state around the catalyst substrate 2. Or, the shock absorbent mat may be formed by a plurality of layers.

Figure 3:
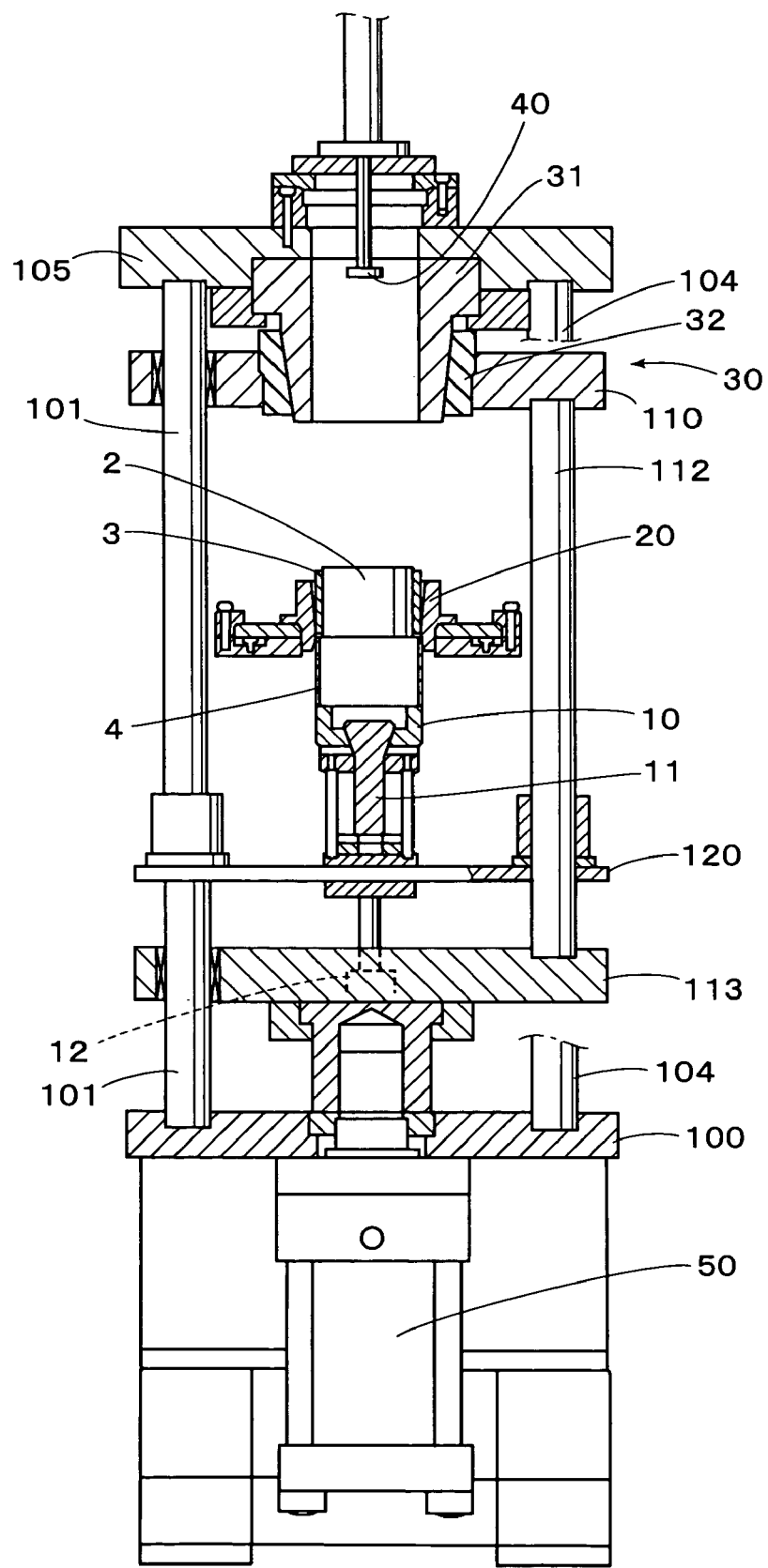
FIG. 3 is a sectional view showing a working state of the apparatus for producing the catalytic converter according to an embodiment of the present invention.
Figure 4:
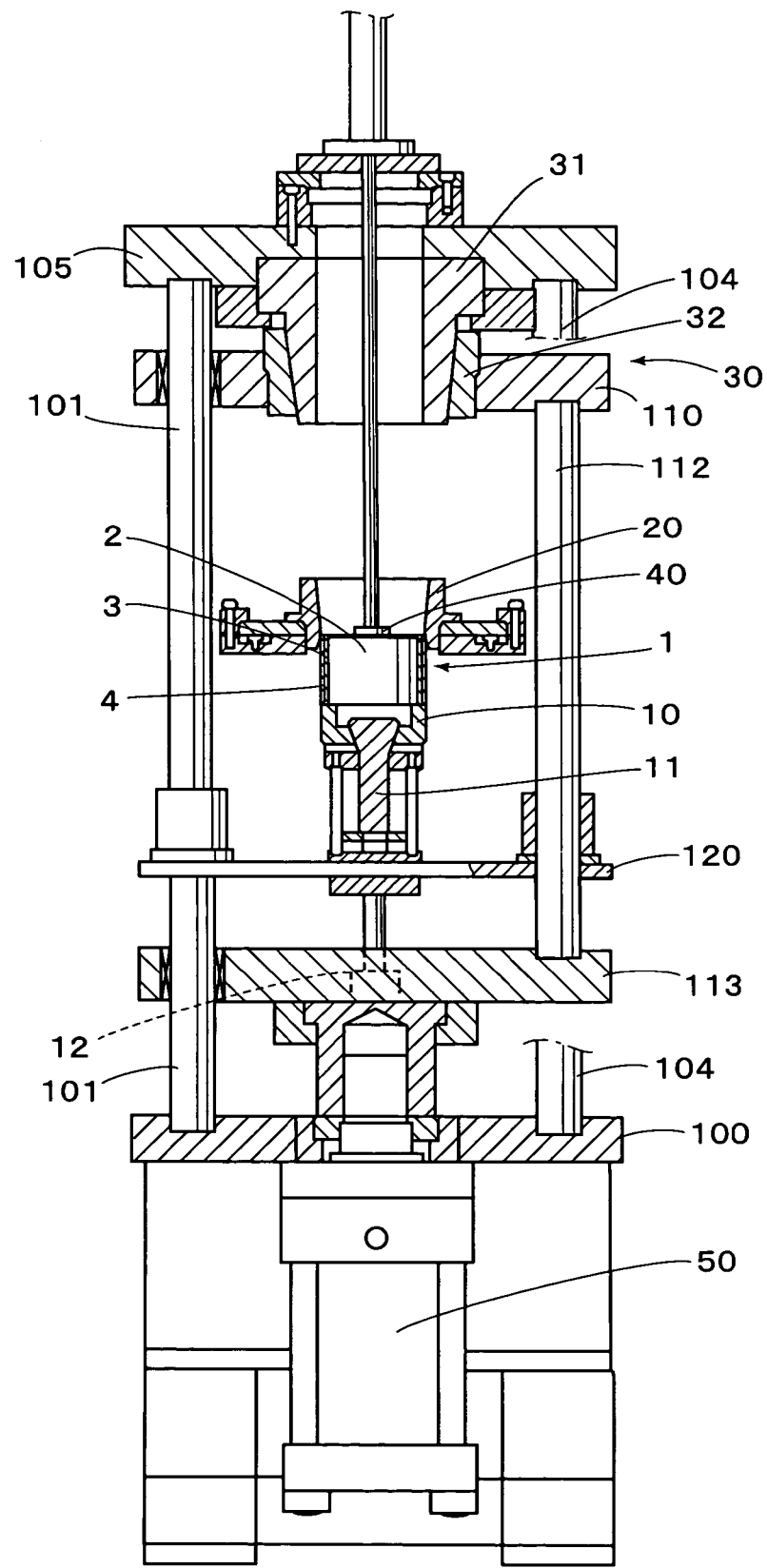
FIG. 4 is a sectional view showing a working state of the apparatus for producing the catalytic converter according to an embodiment of the present invention.

Next, as shown in FIG. 1, the cylindrical housing 4 is supported at its one end portion on the support member 10. In this respect, the cylindrical housing 4 is supported at its one end and its inner side, by the support member 10 with its annular step portion 10a formed along a periphery of its end portion, as shown in FIG. 10(A). Then, the support member 10 is lifted by the air cylinder 12 as shown in FIG. 3 and FIG. 10(B), to fit the other end of the cylindrical housing 4 into an annular step portion 20a formed in the guide member 20. In this state, when the upper end surface of the catalyst substrate 2 is pressed by the pushing member 40, as shown in FIG. 4 and FIG. 10(C), the catalyst substrate 2 (with the shock absorbent mat 3 wrapped around it) is loosely inserted into the cylindrical housing 4, to provide a catalytic converter 1. In this respect, if the outer diameter of the shock absorbent mat 3 was extremely smaller than the inner diameter of the cylindrical housing 4, the catalyst substrate 2 might be fallen through the cylindrical housing 4 to the upper end of cone portion 11. In order to avoid this, a support potion 10b may be formed on the inner side of the cylindrical housing 4 as shown in FIG. 10, to support the catalyst substrate 2 at its end surface. Instead, if resistance for the insertion is large, i.e., the catalyst substrate 2 (with the shock absorbent mat 3 wrapped around it) is to be stuffed (pressed) into the cylindrical housing 4, the inner supporting surface of the support member 10 may be omitted as indicated by a broken line in FIG. 10(C). In this case, the compressed amount of the catalyst substrate 2 with the shock absorbent mat 3, required when these are stuffed into the cylindrical housing 4, is preferably set to be 20%–50% of the reduced diameter of the cylindrical housing 4 only by the shrinking mechanism 30 as will be described later (i.e., the reduced diameter only by sizing process). Although the drawing is omitted herein, the present invention can be applied to such a method as placing the catalyst substrate 2 in a cylindrical housing with its one end portion formed by a necking process (not shown) in advance. In this case, the tip end portion of the support member 10 may be formed to extend longitudinally, to support a body portion of the cylindrical housing 4 at the inner surface of the support member 10.

Figure 5:
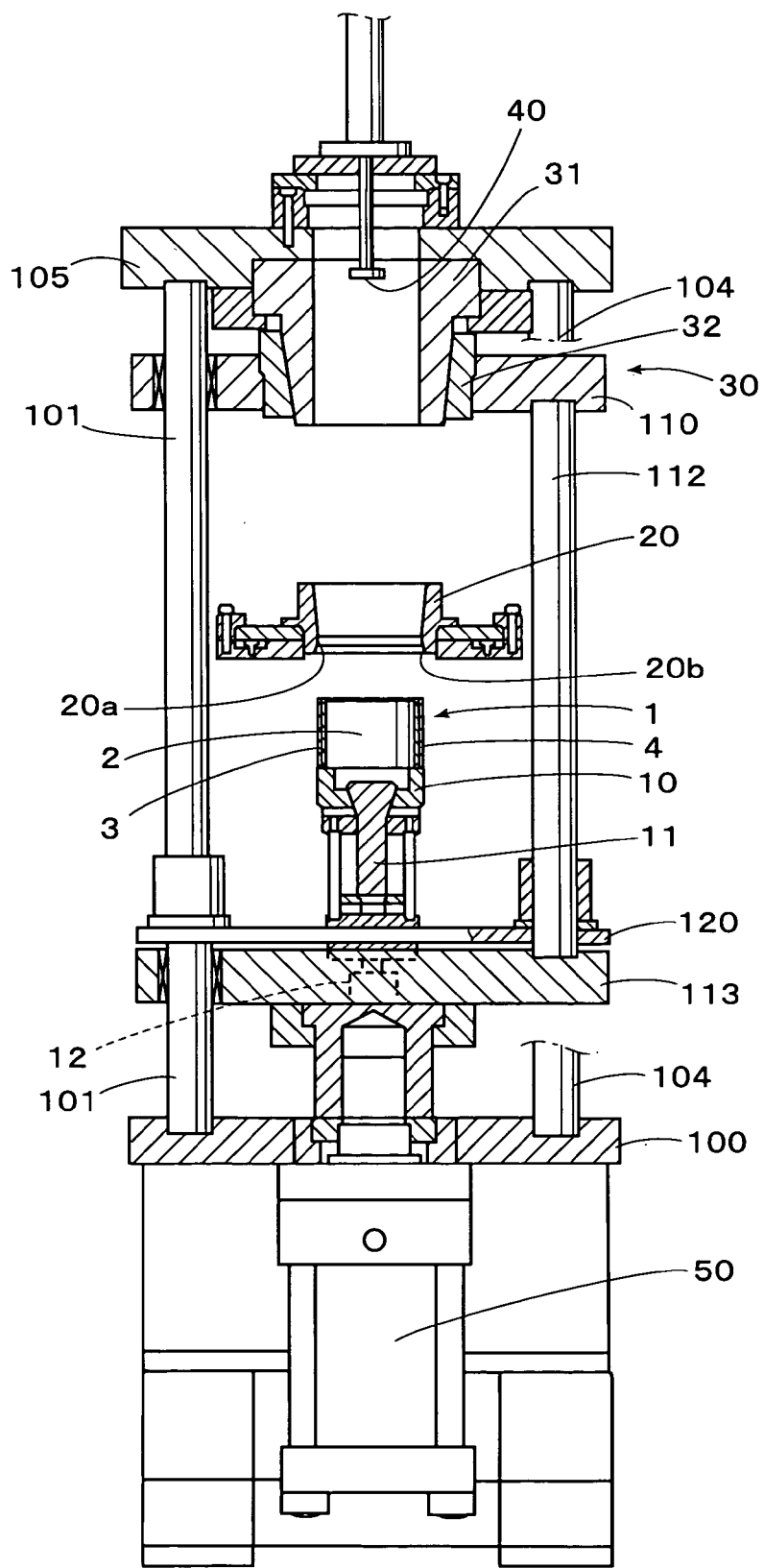
FIG. 5 is a sectional view showing a working state of the apparatus for producing the catalytic converter according to an embodiment of the present invention.
Figure 6:
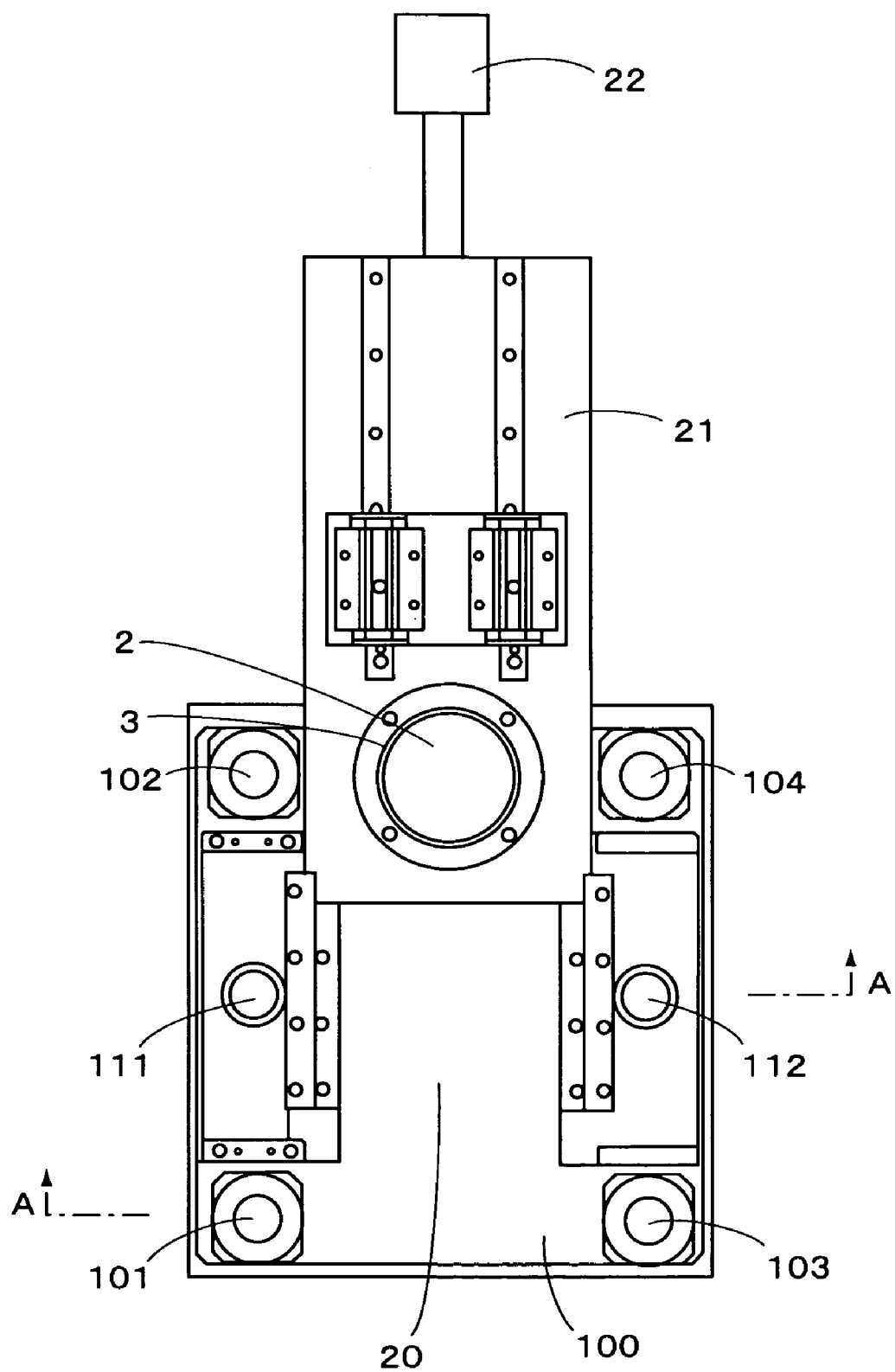
FIG. 6 is a sectional view showing a working state of the apparatus for producing the catalytic converter according to an embodiment of the present invention.
Figure 7:
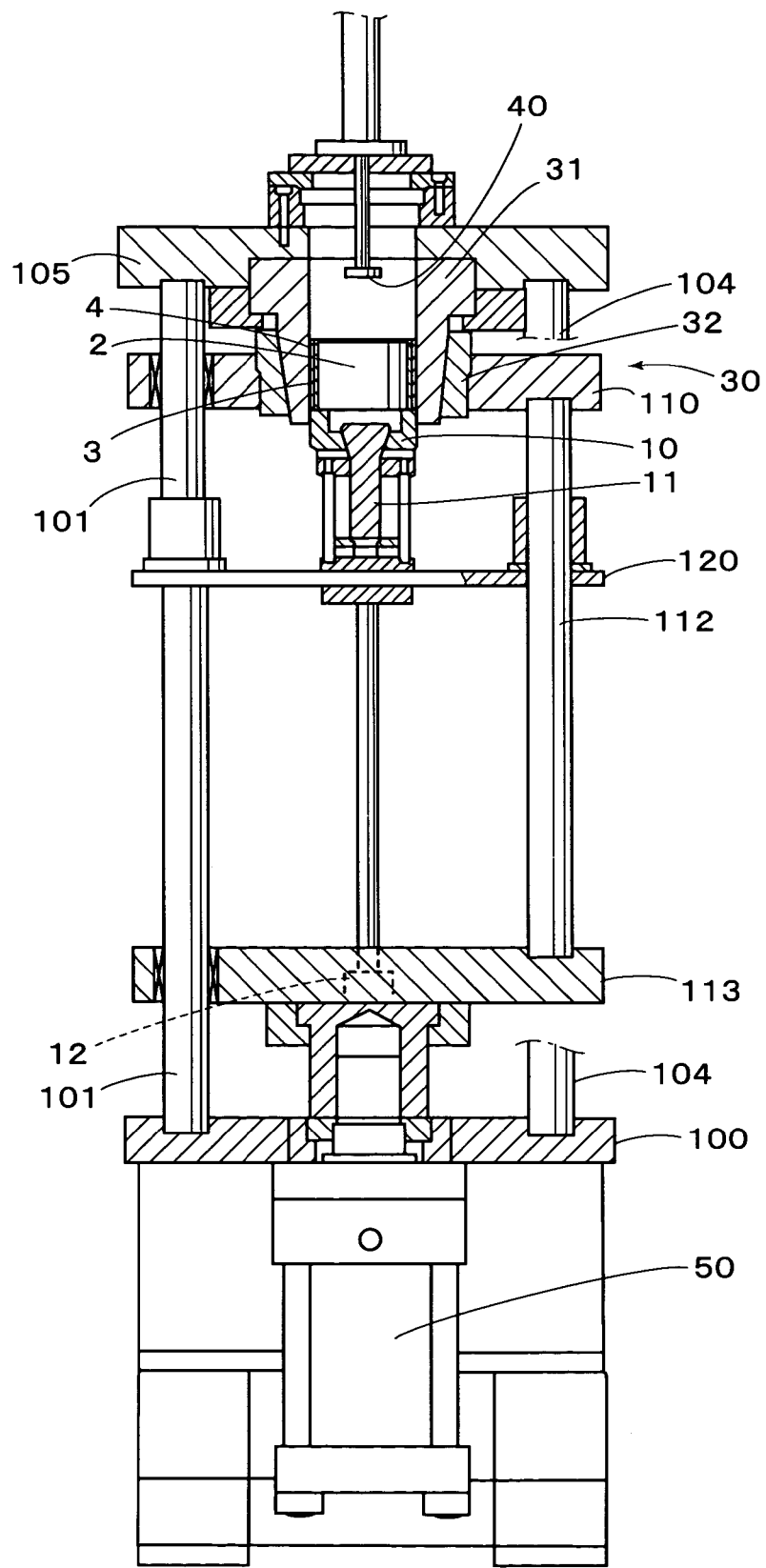
FIG. 7 is a sectional view showing a working state of the apparatus for producing the catalytic converter according to an embodiment of the present invention.

Then, as shown in FIG. 5 and FIG. 10(D), when the support member 10 is moved downward by the air cylinder 12, the catalytic converter 1 is released from the guide member 20. According to the present embodiment, the guide member 20 has been mounted to be movable in the lateral (horizontal) direction to the apparatus. Therefore, after the guide member 20 was retracted by the air cylinder 22 as shown in FIG. 6, the support member 10 is lifted upward again by the air cylinder 12 as shown in FIG. 7, to be placed near the shrinking mechanism 30, so that the catalytic converter 1 is placed in the shrinking mechanism 30.

Figure 2:
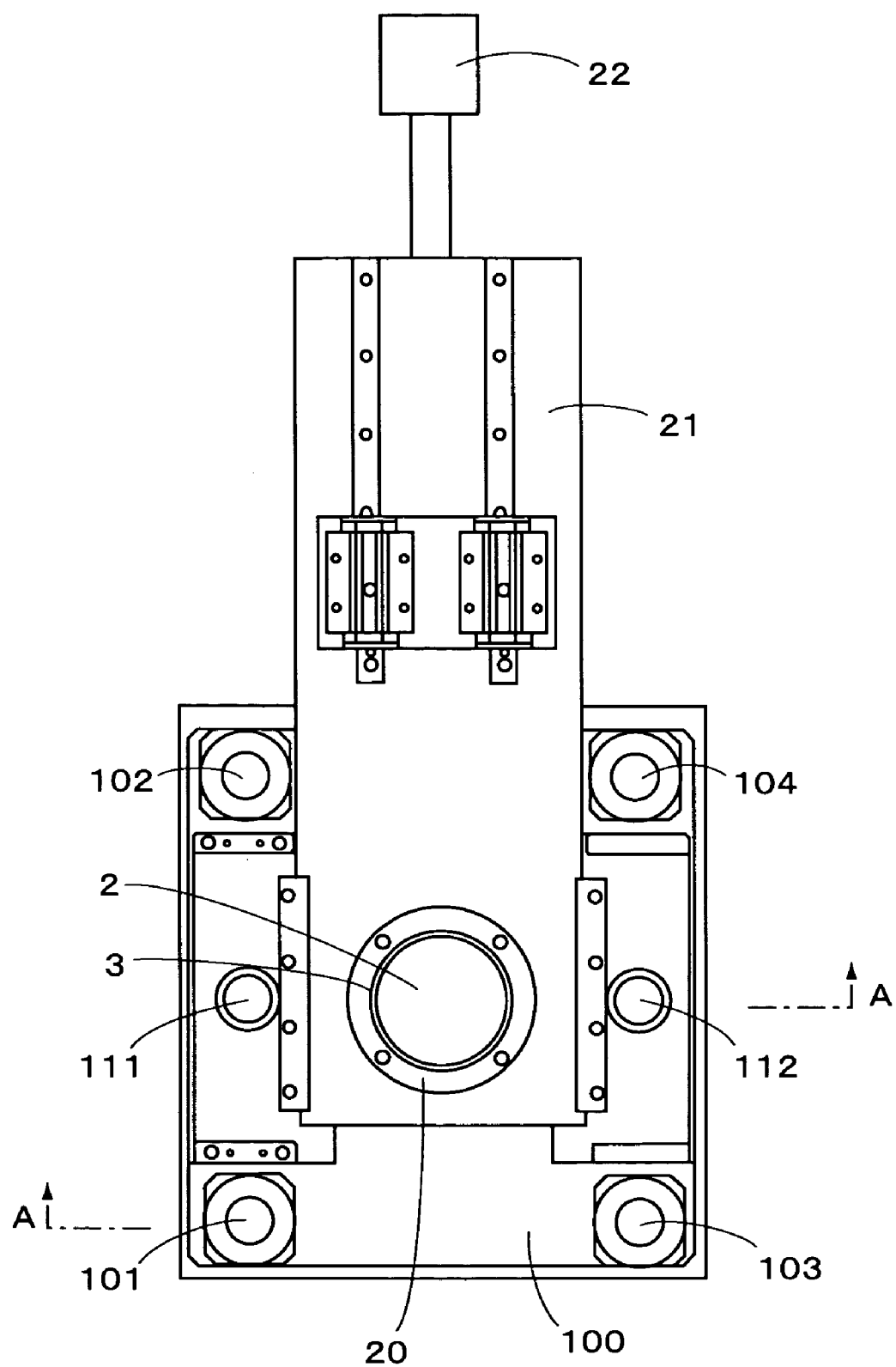
FIG. 2 is a partially sectioned plan view showing a guide member capable of retracting outside of the apparatus for use in the method according to an embodiment of the present invention.
Figure 12:
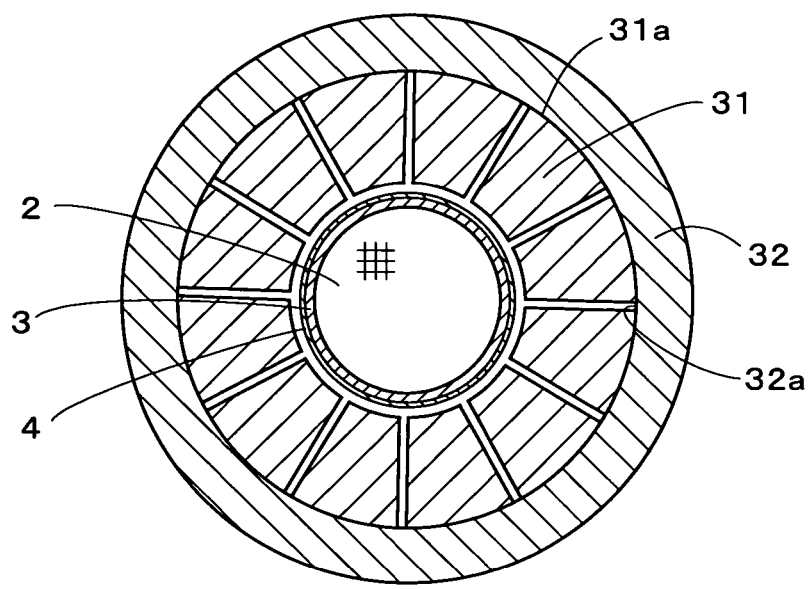
FIG. 12 is a sectional plan view showing a sizing process in the method for producing the catalytic converter according to an embodiment of the present invention.

As shown in FIG. 12, the shrinking mechanism 30 includes a plurality of segments 31 having tapered outer peripheral surface 31a, and clamping members 32 having tapered inner surface 32a to contact and slide on the. tapered outer surface 31a of the segments 31. With the clamping members 32 moved along the longitudinal axis of the cylindrical housing 4, therefore, the segments 31 are moved in a direction toward the longitudinal axis of the cylindrical housing 4. As shown in FIGS. 1 and 2, the clamping members 32 are mounted on the plate 110, which is connected to the actuator 50 through the rods 111 and 112, and the plate 113. As shown in FIG. 7, and enlarged at the left in FIG. 11, although a part of the support member 10 is inserted into the segments 31 according to the present embodiment, the support member 10 can be moved in a radial direction toward the longitudinal axis of the catalytic converter 1 together with the segments 31 in response to movement of the cone portion 11, whereby the shrinking operation will not be interfered with the support member 10. Instead, the support member 10 may be so constituted not to be inserted into the segments 31.

Figure 8:
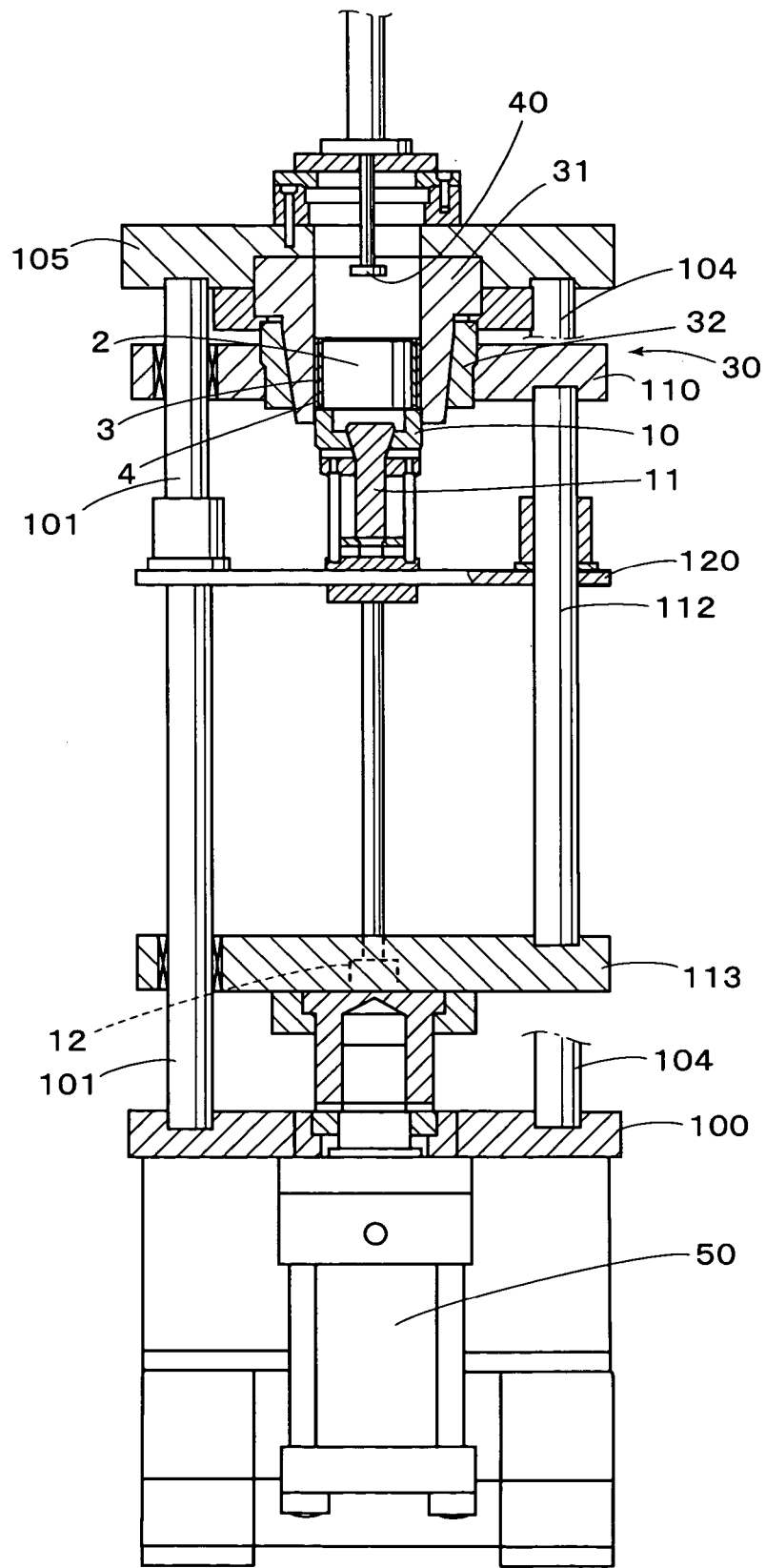
FIG. 8 is a sectional view showing a working state of the apparatus for producing the catalytic converter according to an embodiment of the present invention.
Figure 9:
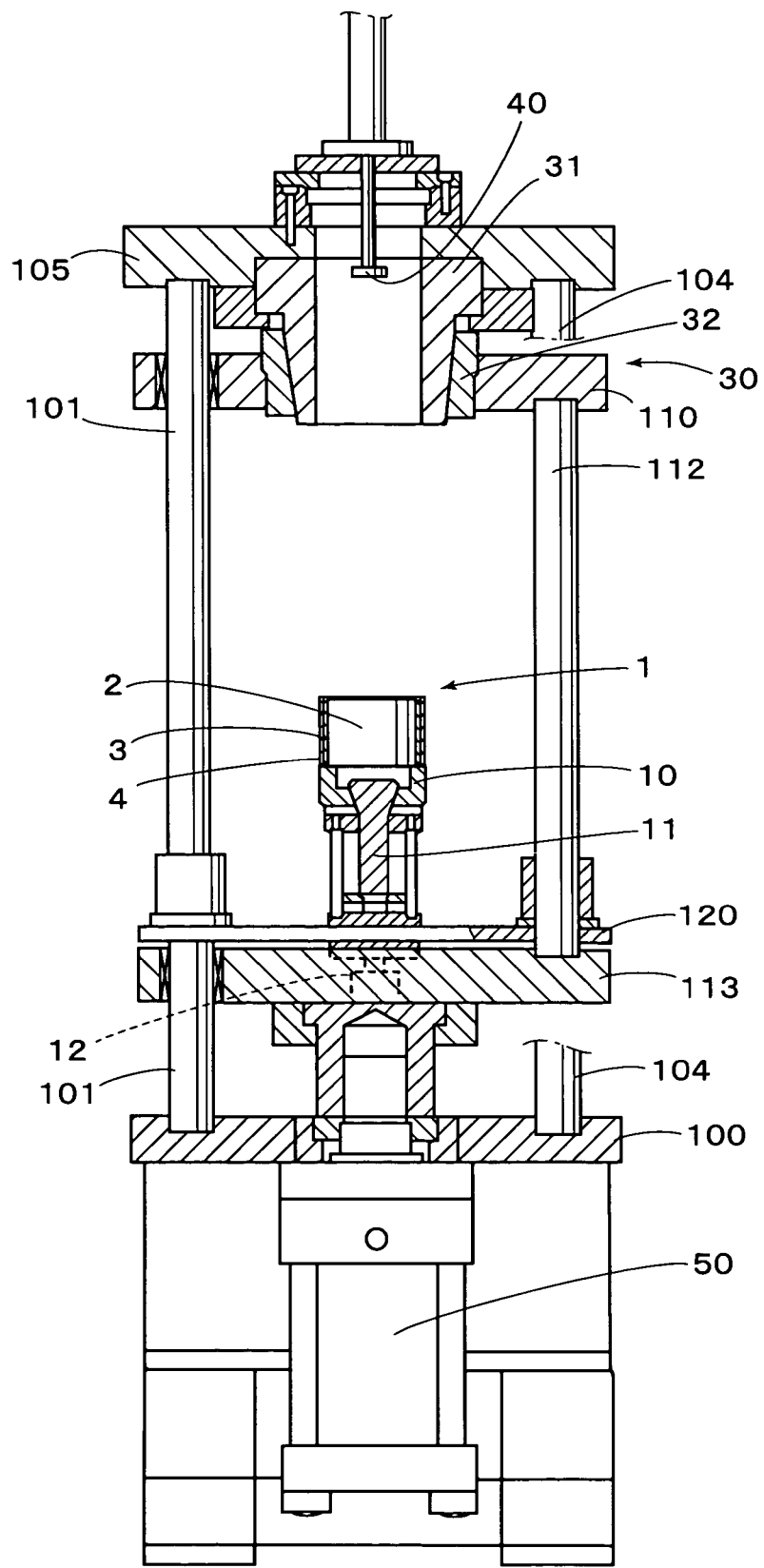
FIG. 9 is a sectional view showing a working state of the apparatus for producing the catalytic converter according to an embodiment of the present invention.

Next, as shown in FIG. 8 and FIG. 11, when the plate 110 is lifted upward by the actuator 50 through the rods 111 and 112, the clamping members 32 are lifted as well. Consequently, the segments 31 are moved relatively to the clamping members 32, to be moved in a radial direction toward the longitudinal axis of the catalytic converter 1, so that the diameter of the cylindrical housing 4 is reduced. In this case, the reduced diameter can be provided according to density (g/cm$^3$) of the shock absorbent mat 3, outer diameter of the catalyst substrate 2, inner diameter of the cylindrical housing 4, or the like. For example, the plate 110 may be set so as to be lifted at the maximum of D cm relative to the left side in FIG. 11. Or, the method for compressing the shock absorbent mat 3 wrapped around the catalyst substrate 2, by a pushing member (not shown) in a direction perpendicular to the longitudinal axis of the catalyst substrate 2, measuring a stroke when the predetermined pressure is obtained, and reducing the diameter of the cylindrical housing 4 to provide an inner diameter corresponding to the measured pressure, as described in the Japanese Patent Laid-open Publication No. 2003-286836. Thereafter, when the plate 110 is moved downward by the actuator 50 through the rods 111 and 112, the clamping members 32 are moved downward as well. Consequently, the segments 31 are moved outward in a radial direction, so that the catalytic converter 1 with its body portion reduced in diameter, is released from the segments 31. Therefore, with the support member 10 moved downward by the air cylinder 12, the catalytic converter 1 can be removed.

Figure 13:
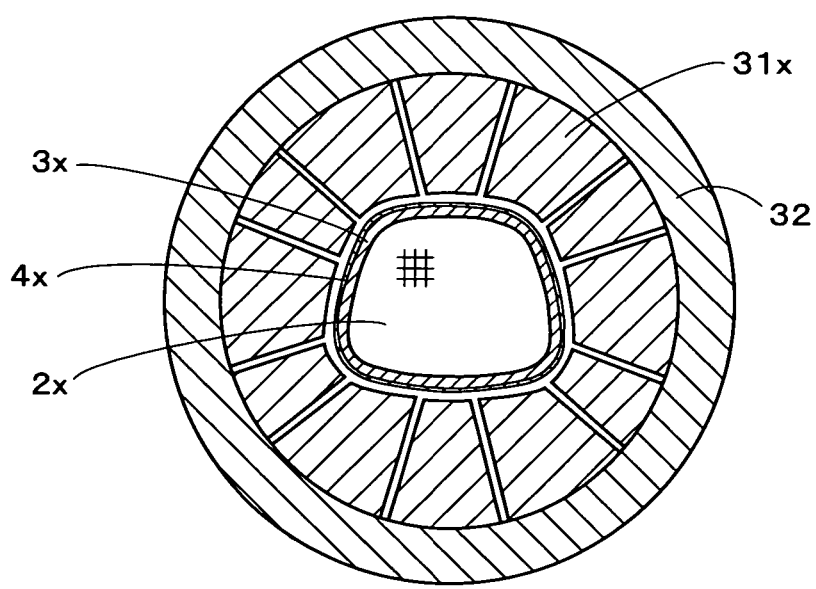
FIG. 13 is a sectional plan view showing another embodiment of a sizing process in the method for producing the catalytic converter according to an embodiment of the present invention.

According to the method as described above, the catalytic converter 1 can be formed into a circle or approximately trapezoid in cross section as shown in FIGS. 12 and 13, and can be formed into a triangle, quadrangle, racetrack, oval and other various configurations in cross section, so that the catalytic converter 1 is not limited to any configuration in cross section. The number and configuration of segments 31 may be provided in response to any sectional configuration of the catalytic converter 1. In the case where an edge portion or a portion with a small radius of curvature is formed at a corner of a catalytic converter 2x as shown in FIG. 13, segments 31x as shown in FIG. 13 are preferably placed to be positioned at the edge portion or portion with a small radius of curvature, in order that a clearance between neighboring segments will not be positioned at the corner of the catalytic converter 2x. As a result, the catalytic converter 2x including the hardly formed corner portion can be formed accurately, to reduce its diameter at a proper accuracy.

Figure 19:
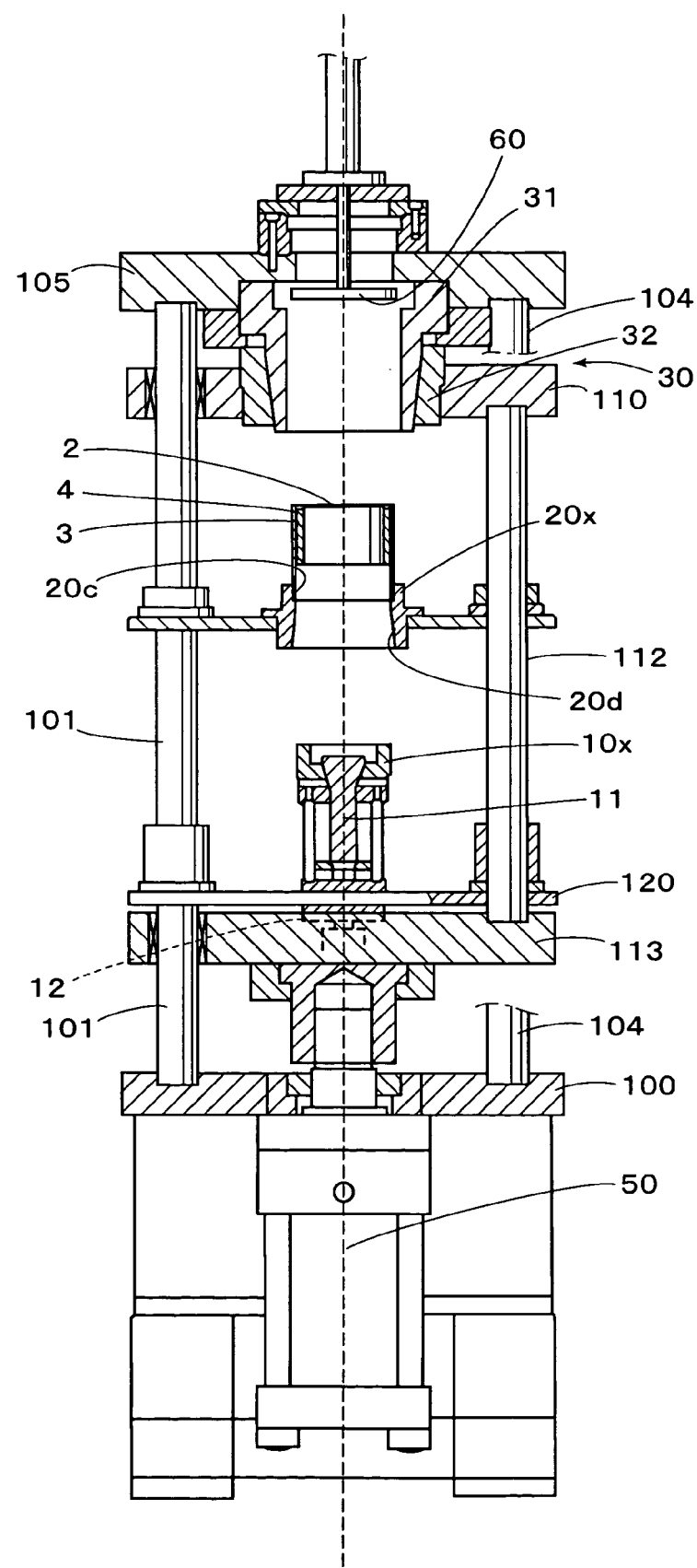
FIG. 19 is a sectional view showing a working state of the apparatus for producing the catalytic converter according to another embodiment of the present invention.
Figure 20:
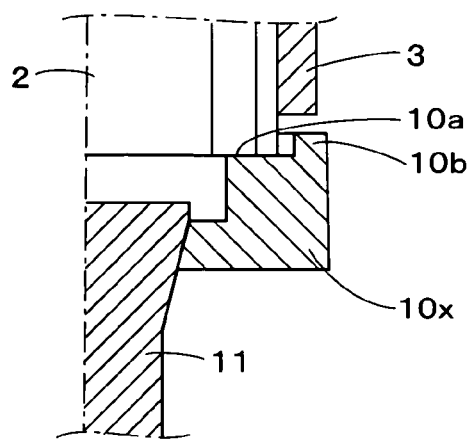
FIG. 20 is an enlarged sectional view showing a part of the apparatus for producing the catalytic converter according to another embodiment of the present invention.
Figure 21:
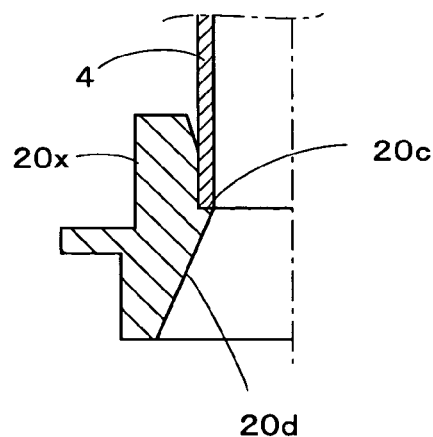
FIG. 21 is an enlarged sectional view showing a part of the apparatus for producing the catalytic converter according to another embodiment of the present invention.

FIGS. 14–21 relate to another embodiment of the present invention, wherein FIGS. 14–19 show a sectional view of each process performed by an apparatus for producing the catalytic converter, and FIGS. 20 and 21 show enlarged sectional views of a part of the apparatus. According to this apparatus, the catalyst substrate 2 and cylindrical housing 4 have been placed upside down, so that the relative position of them has been reversed, comparing with the embodiment as described before. According to the apparatus of the present embodiment, therefore, the catalyst substrate 2 with the shock absorbent mat 3 wrapped around it is placed on the support member 10, whereas the cylindrical housing 4 is placed on an annular step portion 20c of a guide member 20x from an upper position thereof, and the guide member 20x is formed with a tapered portion 20d opening downward. Consequently, the longitudinal axis of the catalyst substrate 2 will not be positioned to be oblique to or offset from the longitudinal axis of the cylindrical housing 4, as pointed out in Japanese Patent Laid-open Publication No. 2003-225834, but will be inserted or stuffed into the cylindrical housing 4 appropriately and smoothly.

In the present embodiment as enlarged in FIG. 20, the support member 10x is formed with an annular step portion 10a, on which the catalyst substrate 2 is placed, with a small clearance, e.g., approximately 1.5 mm, horizontally spaced against an outside wall portion 10b. As shown in FIG. 21, the cylindrical housing 4 is fitted into the annular step portion 20c of the guide member 20x by hand. In other words, the cylindrical housing 4 is received in the annular step portion 20c without substantial clearance. The guide member 20x is supported by an air cylinder or the like (not shown) to provide a so-called floating support, and it is not moved in a lateral (horizontal) direction as done in the previous embodiment. Furthermore, a pushing member 60 has been formed in a circular plate having a relatively large diameter comparing with the pushing member 40 as shown in FIG. 1, because the pushing member 60 has to be larger in diameter than the outer diameter of the cylindrical housing 4. The remaining structural elements are substantially the same as those described in the previous embodiment, so that they are designated by corresponding reference numerals, and explanation about them will be omitted herein.

Figure 14:
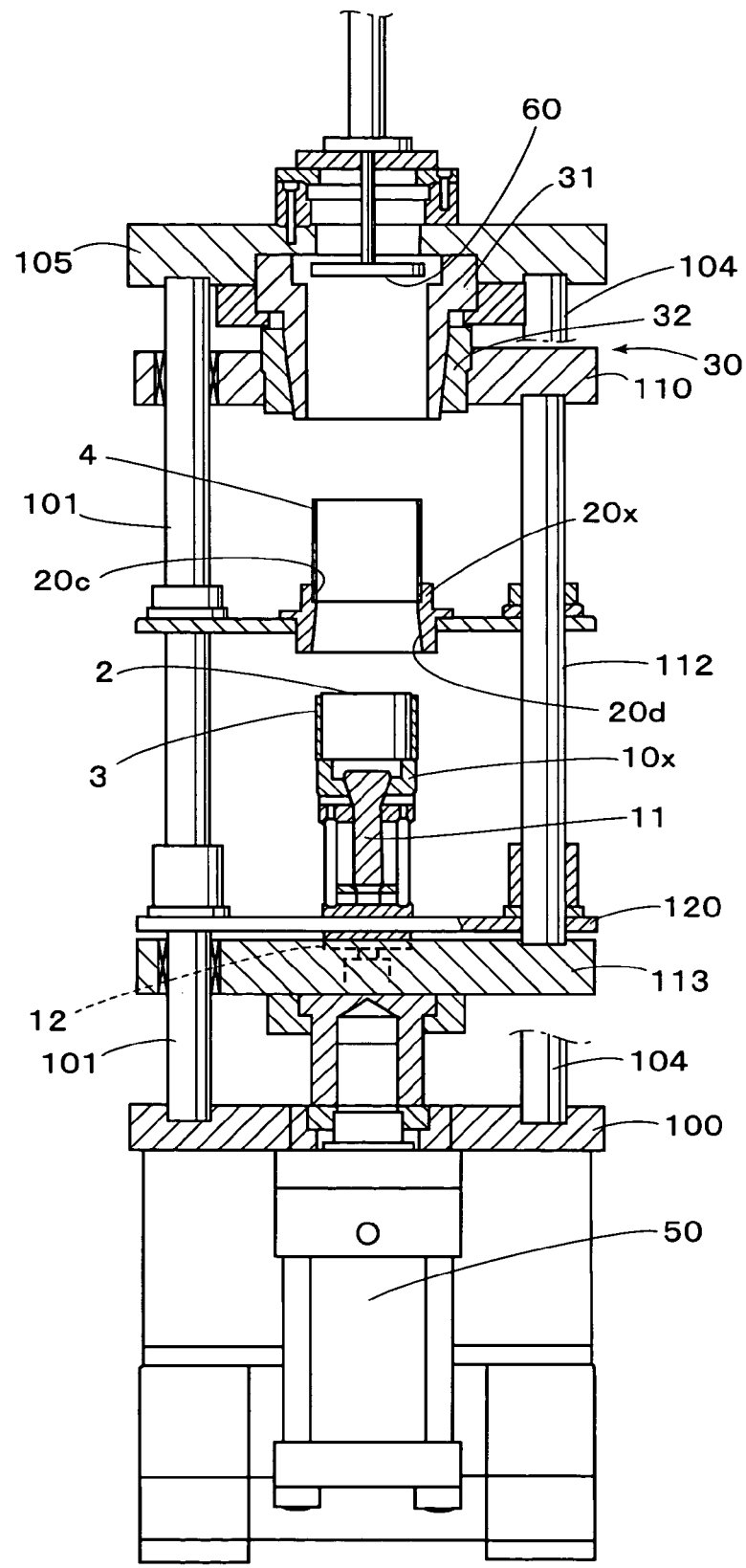
FIG. 14 is a sectional view showing a working state of the apparatus for producing the catalytic converter according to another embodiment of the present invention.
Figure 15:
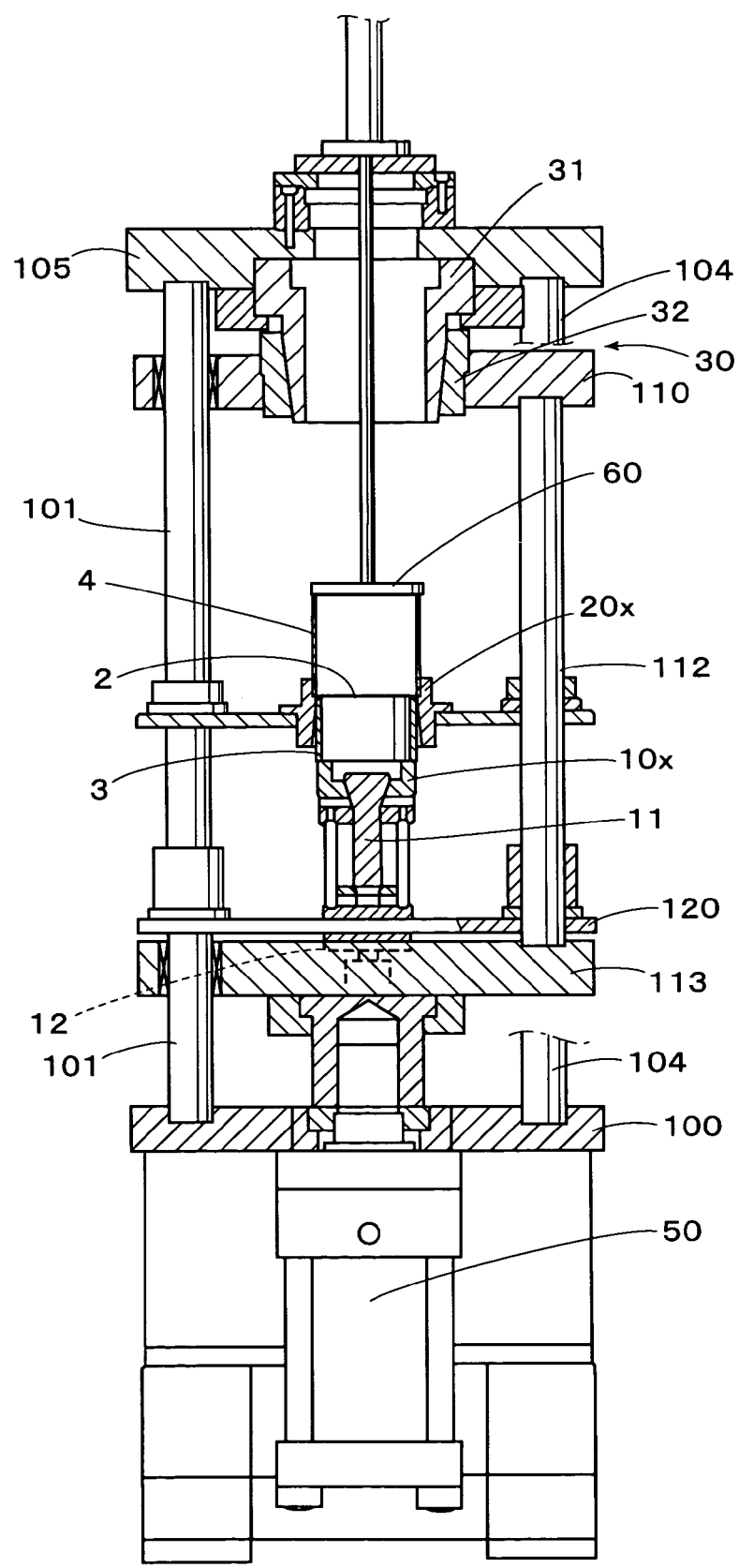
FIG. 15 is a sectional view showing a working state of the apparatus for producing the catalytic converter according to another embodiment of the present invention.
Figure 16:
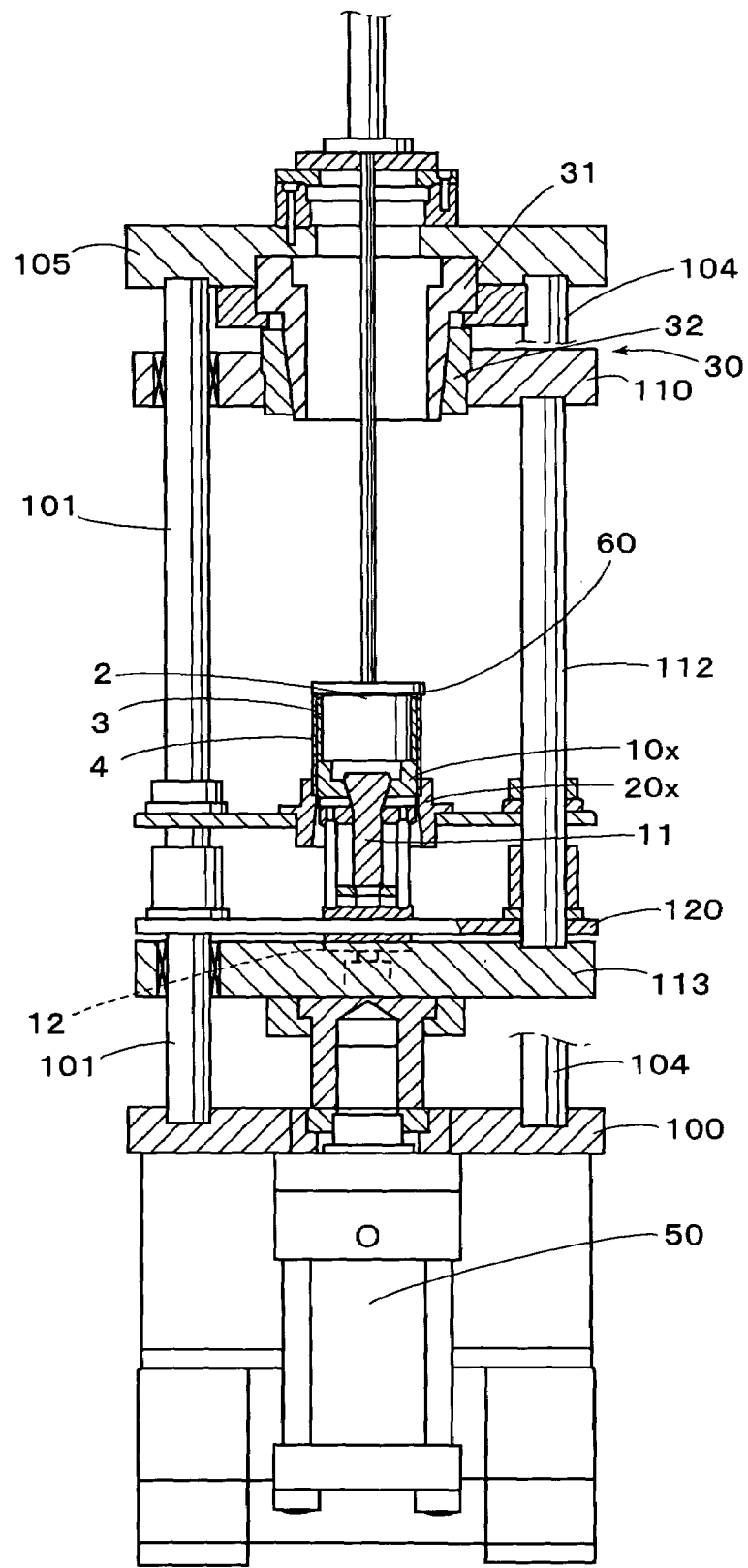
FIG. 16 is a sectional view showing a working state of the apparatus for producing the catalytic converter according to another embodiment of the present invention.

Accordingly, the catalyst substrate 2 with the shock absorbent mat 3 wrapped around it and the cylindrical housing 4 are placed on the support member 10x and the guide member 20x, respectively, as shown in FIG. 14. Then, the upper end of the cylindrical housing 4 is pressed by the pushing member 6b, as shown in FIG. 15, so that the cylindrical housing 4 is moved downward together with the guide member 20x, whereby the catalyst substrate 2 (with the shock absorbent mat 3 wrapped around it) is received or stuffed into the cylindrical housing 4 as shown in FIG. 16. When it is received or stuffed into the cylindrical housing 4, the clearance is provided against the wall portion 10b of the support member 10x, so that the catalyst substrate 2 can be moved in the horizontal direction. As a result, an automatic centering operation can be achieved to ensure a stable insertion or stuffing operation.

Figure 17:
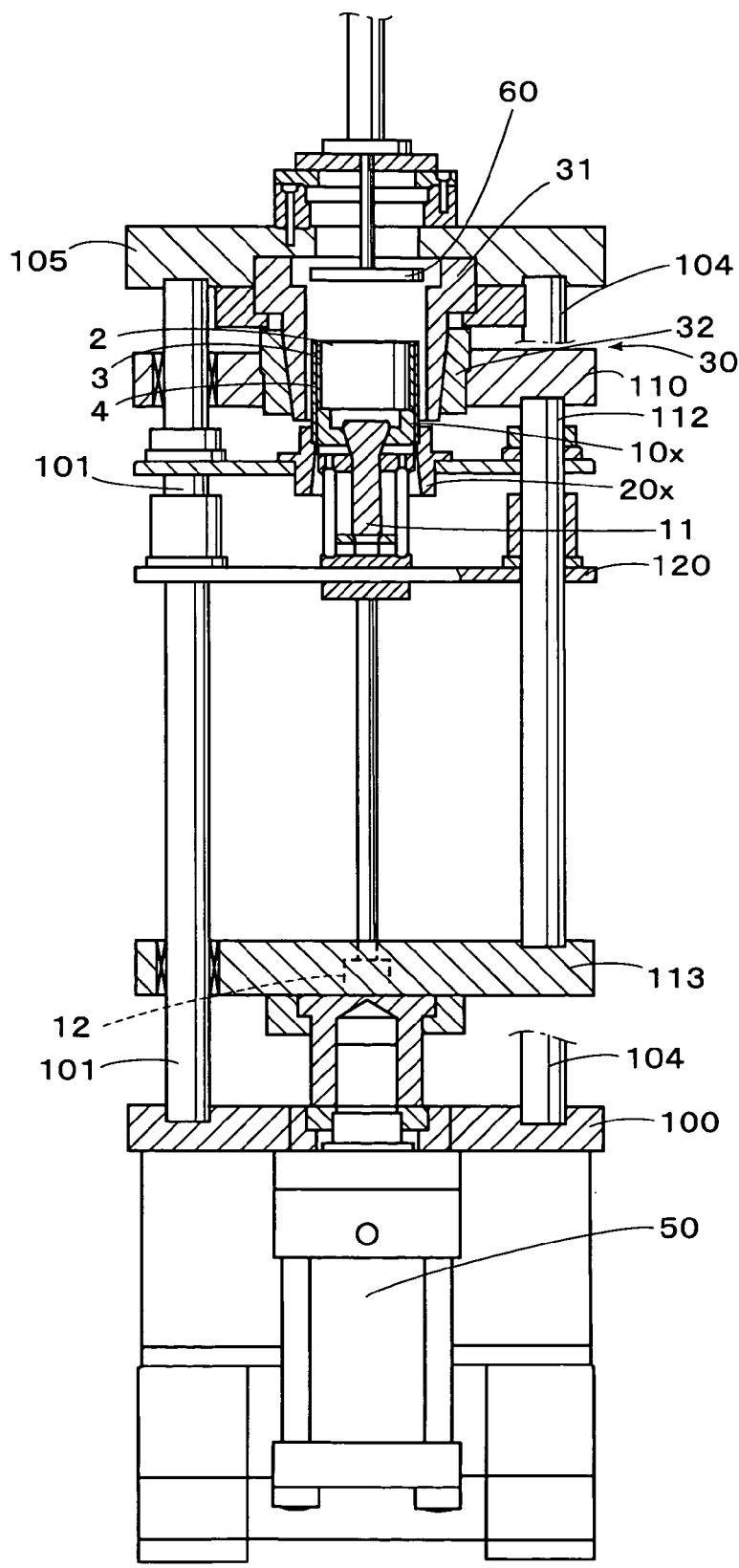
FIG. 17 is a sectional view showing a working state of the apparatus for producing the catalytic converter according to another embodiment of the present invention.
Figure 18:
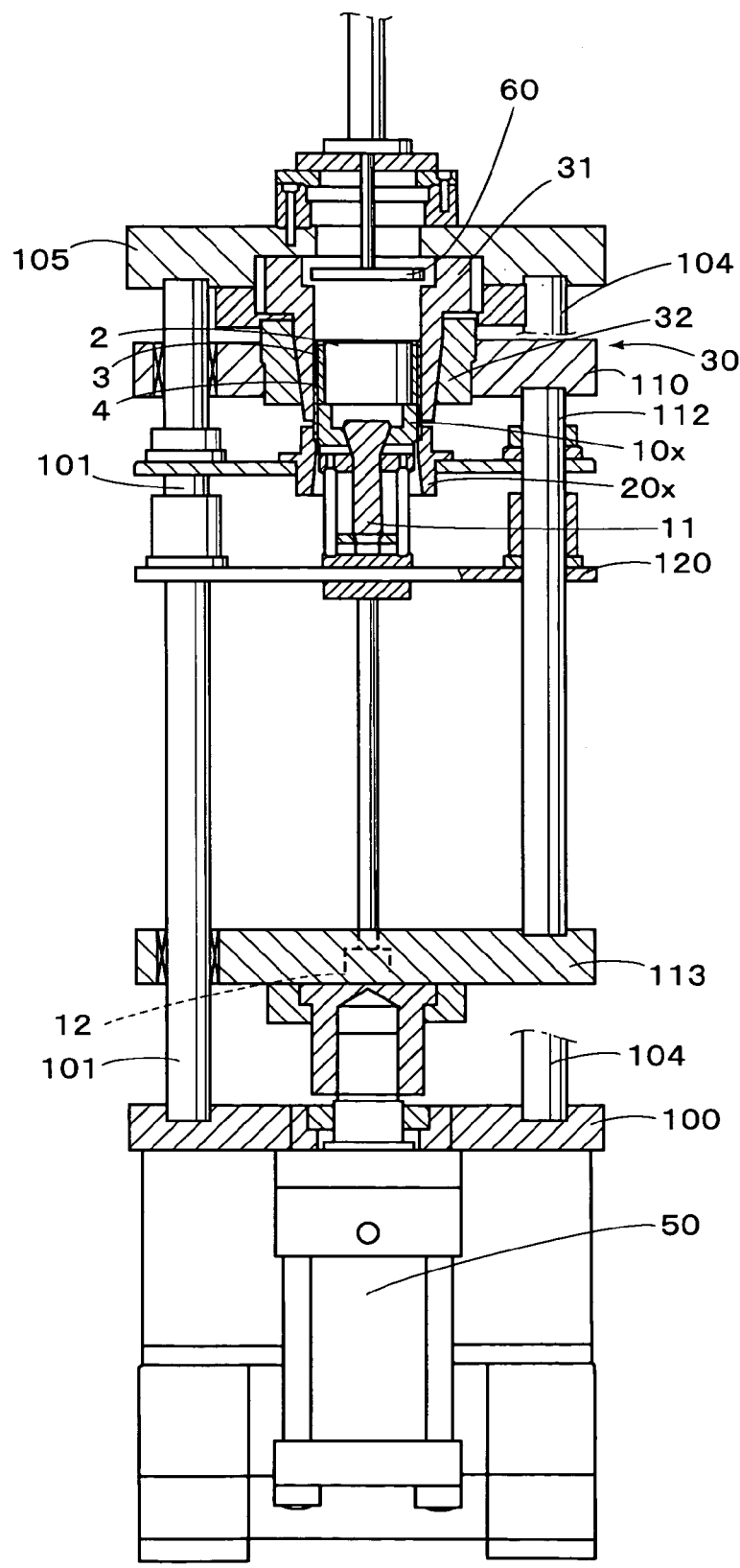
FIG. 18 is a sectional view showing a working state of the apparatus for producing the catalytic converter according to another embodiment of the present invention.
Figure 22:
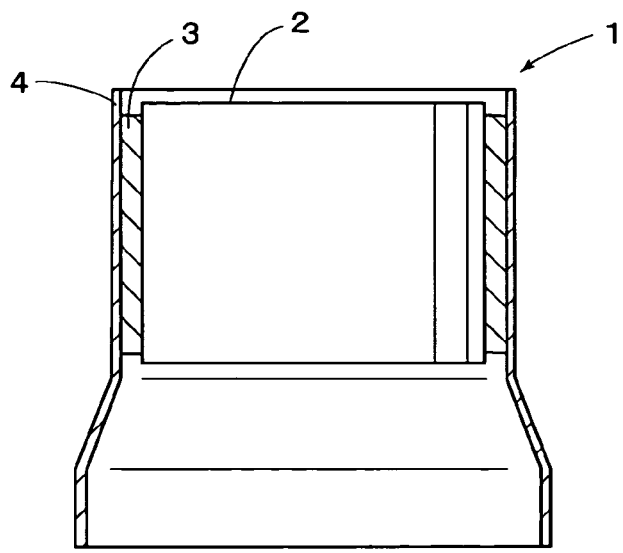
FIG. 22 is a sectional view showing a catalytic converter produced by the apparatus according to an embodiment of the present invention.

Next, as shown in FIG. 17, the support member 10x is lifted upward by the air cylinder 12, the catalytic converter 1 is inserted into the segments 31 of the shrinking mechanism 30. Then, the plate 110 is lifted by the actuator 50 through the rods 111 and 112, and the clamping members 32 are lifted as well. Consequently, the segments 31 are moved relatively to the clamping members 32, to be moved in a radial direction toward the longitudinal axis of the catalyst substrate 2, so that the diameter of the cylindrical housing 4 is reduced. Thereafter, the plate 110 is moved downward by the actuator 50 through the rods 111 and 112, and the clamping members 32 are moved downward, as shown in FIG. 19, whereby the segments 31 are moved outward in a radial direction, respectively, to release the catalytic converter 1 reduced in diameter from the segments 31. Therefore, with the support member 10x moved downward by the air cylinder 12, the catalytic converter 1 can be removed. Thus, the guide member 20x is not required to be retracted from the apparatus according to the present embodiment, so that the structure can be made simple. The shrinking mechanism 30 may be placed below the support member 10x, instead of being placed above the support member 10x. In this case, the guide member 20x is not required to be retracted from the apparatus. According to the present embodiment, therefore, the catalytic converter 1 is produced as shown in FIG. 22.

The columnar member container of the present invention is not limited to the catalytic converter, but may be used for a diesel exhaust gas treatment device, wherein the columnar member corresponds to the diesel particulate filter (DPF). And, the present invention may be applied to apparatuses for holding other columnar members. With respect to the shrinking mechanism 30, drawing dies as disclosed in the aforementioned Japanese Patent Laid-open Publication No. 2002-263764 may be employed, without using the segments and clamping members. Or, the present invention may be applied to a catalytic converter of a so-called tourniquet type, wherein the diameter of the housing is reduced by pulling both ends of a band-like member wrapped around it. Furthermore, may be employed the aforementioned method for applying the axial load to the substrate after the first sizing process was made thereto, and obtaining a relationship between the maximum coefficient of friction and the diameter of the housing on the basis of the load applied at that time, estimating the diameter of the housing to provide an appropriate load for holding the substrate on the basis of the relationship, and reducing the diameter of the housing to obtain the most appropriate diameter in the second sizing process. Although the catalyst substrate 2 is a ceramic honeycomb structural member, the present invention can be easily applied to the member with cells having hexagonal cross sections, which is good at gas purifying ability and low passing resistance, but which is fragile as described in Japanese Patent Laid-open Publication No. 11-320723. In this case, the diameter of the housing may be reduced by six segments facing each other on three axes, as described in the aforementioned co-pending U.S. patent application.

Figure 23:
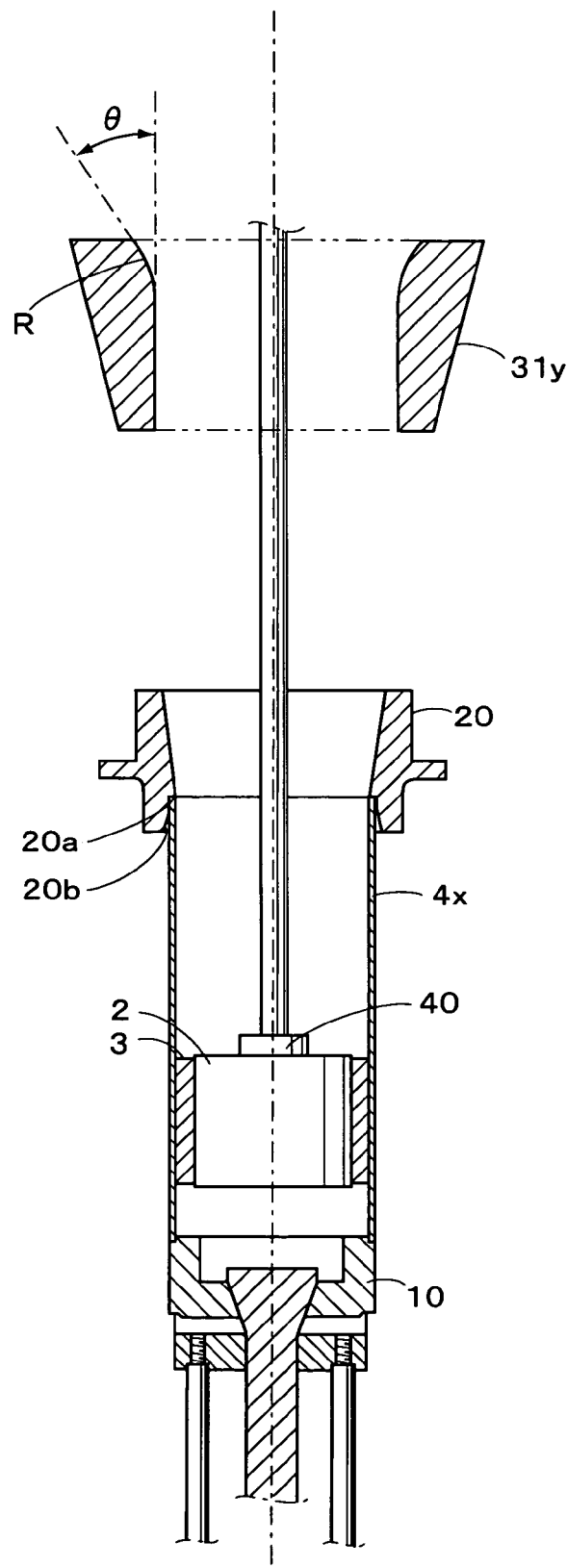
FIG. 23 is a sectional view showing a working state of the apparatus for producing the catalytic converter according to a further embodiment of the present invention.

Furthermore, the present invention can be applied to a catalytic converter with a plurality of catalyst substrates arranged on a common axis in a cylindrical housing, such as the one of a tandem type with two substrates aligned along a longitudinal axis, as will be explained with reference to FIGS. 23–28. At the outset, as shown in FIG. 23, an elongated cylindrical housing 4x is mounted at its lower end on the support member 10, with its upper end held by the guide member 20. Then, the catalyst substrate 2 with the shock absorbent mat 3 wrapped around it is inserted (stuffed) into the cylindrical housing 4x by the pushing member 40.

Figure 24:
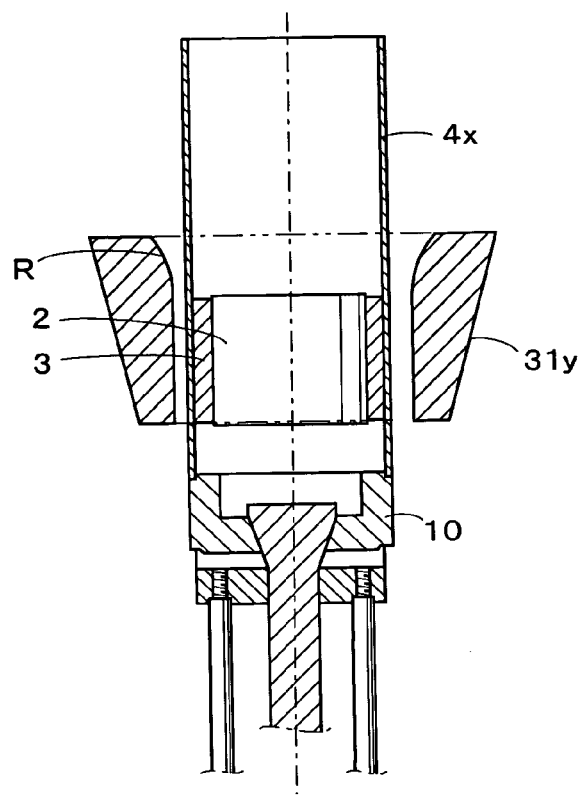
FIG. 24 is a sectional view showing a working state of the apparatus for producing the catalytic converter according to a further embodiment of the present invention.
Figure 25:
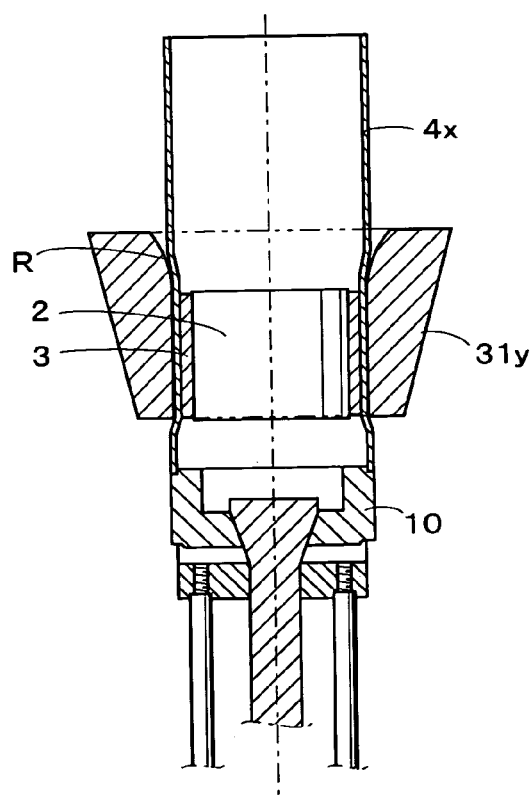
FIG. 25 is a sectional view showing a working state of the apparatus for producing the catalytic, converter according to a further embodiment of the present invention.
Figure 26:
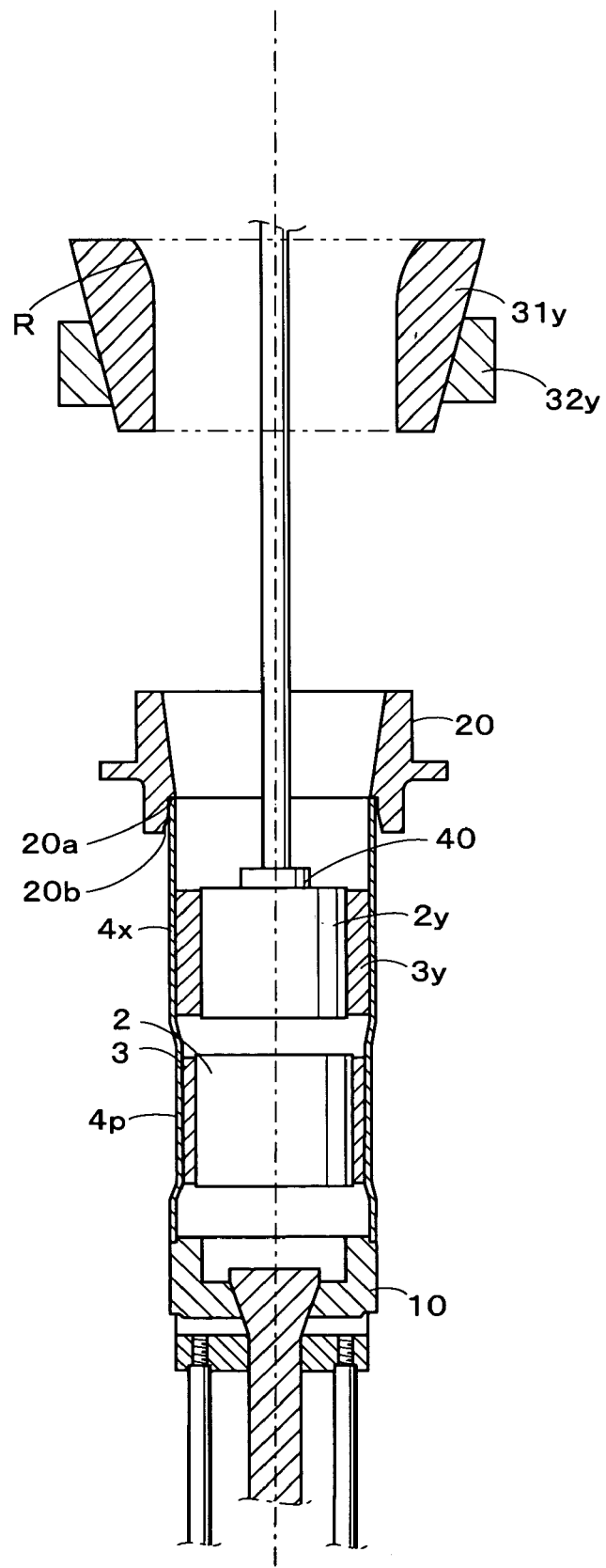
FIG. 26 is a sectional view showing a working state of the apparatus for producing the catalytic converter according to a further embodiment of the present invention.
Figure 27:
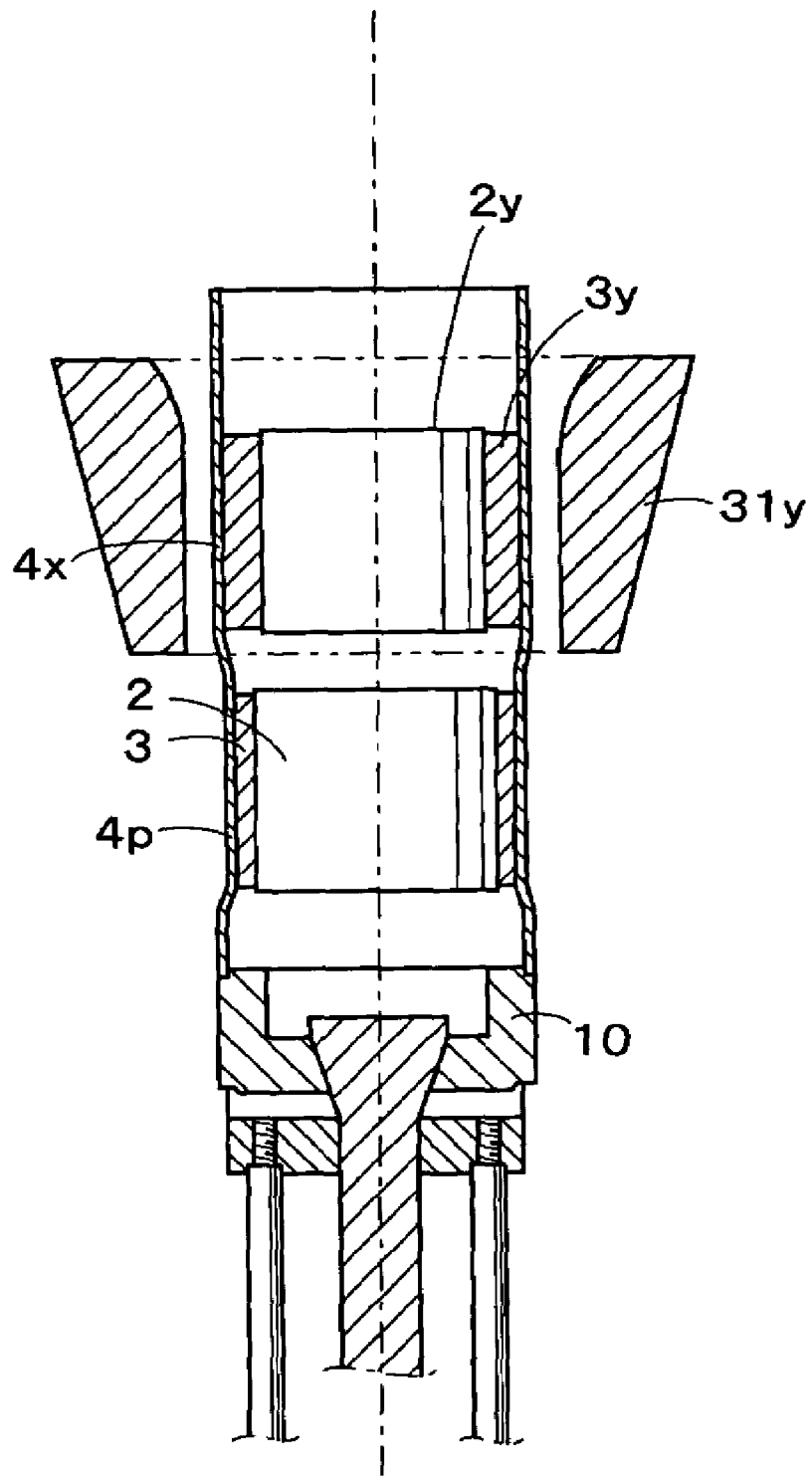
FIG. 27 is a sectional view showing a working state of the apparatus for producing the catalytic converter according to a further embodiment of the present invention.
Figure 28:
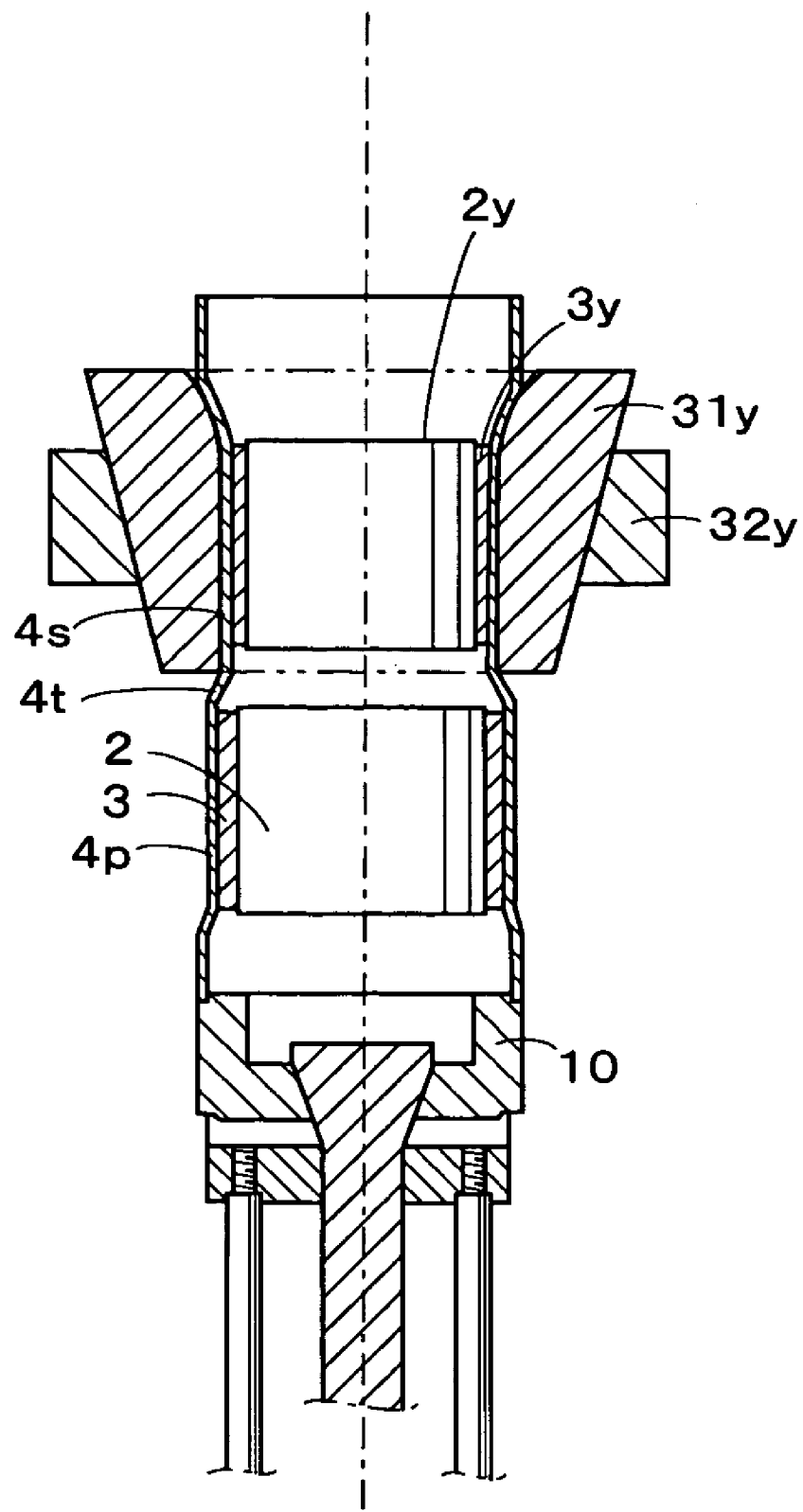
FIG. 28 is a sectional view showing a working state of the apparatus for producing the catalytic converter according to a further embodiment of the present invention.

Next, as shown in FIGS. 24 and 25, the diameter of the cylindrical housing 4x is reduced by segments 31y, at an inner end portion of which a curved surface is formed preferably. The opening angle θ as shown in FIG. 23 is preferably set to be equal to or smaller than 30 degree. With the cylindrical housing 4x reduced in diameter by means of the segments 31y as formed above, the accuracy of the configuration of the reduced diameter portion (indicated by "4s" in FIG. 28) formed by the second sizing process followed by the above process, will be improved. That is, after the sizing process was performed as shown in FIG. 25, to form a reduced diameter portion 4p for the first step as shown in FIG. 26, a second catalyst substrate 2y having a cross section of smaller diameter than the catalyst substrate 2, with a shock absorbent mat 3y wrapped around it, is inserted into the cylindrical housing 4x. Then, the cylindrical housing 4x is reduced in diameter as the second sizing process, by means of the segments 31y and clamping members 32y, as shown in FIGS. 27 and 28. As a result, a second reduced diameter portion 4s is formed, and a stepped portion 4t is formed between the first reduced diameter portion 4p and the second reduced diameter portion 4s, as shown in FIG. 28. In this case, the stepped portion 4t is formed to provide a smoothly curved surface, to ensure a more accurate configuration comparing with the conventional segments 31.

In order to ensure that the product with the catalyst substrate 2 held as described above is the one with a holding force (pressure) having a certain property being maintained, it may be so constituted that the substrate with the sizing process applied thereto is actually pressed to confirm a drawing load being ensured, or so constituted that the outer diameter of the sized one is measured to be used as an alternative value to the pressure. In this case, a device (e.g., linear gage or the like) for measuring the positions of the segments 31 or the like may be added, or an image recognition device using a laser beam or the like may be employed for a remote control measurement.

Figure 29:
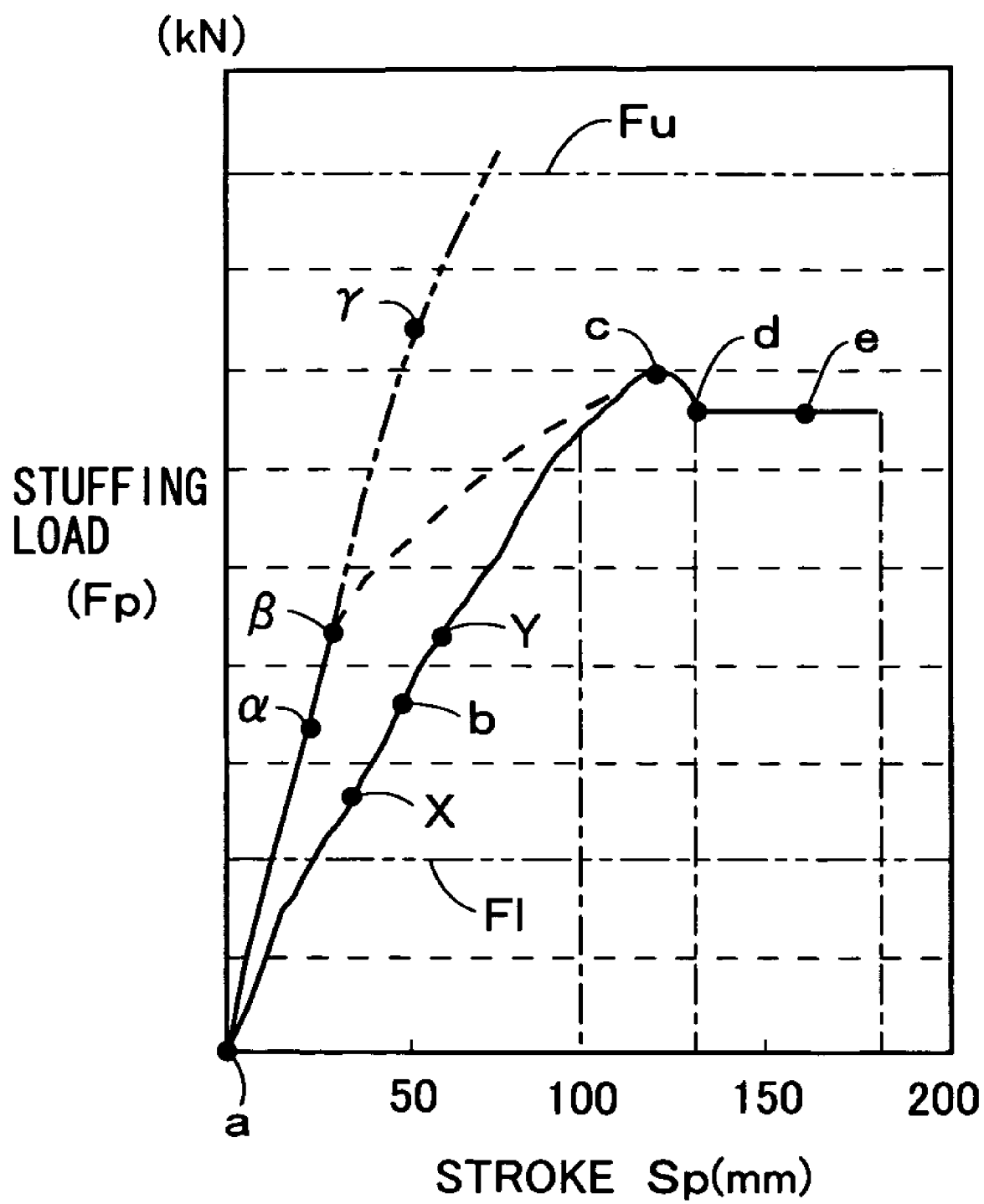
FIG. 29 is a diagram for showing a load-stroke characteristic in a stuffing process according to another embodiment of the present invention.

FIG. 29 shows a relationship between an axially moving distance (i.e., stroke) of the catalyst substrate 2 and axial load applied to the catalyst substrate 2, in the case where the catalyst substrate 2 with the shock absorbent member 3 wrapped around it is stuffed into the cylindrical housing 4, and a solid line (a-b-c-d-e) is a stuffing load curve in a stuffing process as described in Japanese Patent Laid-open Publication No. 2003-225834, for example. In view of the requirement of efficiency in mass production, when a reduction in cycle time, i.e., shortening a stuffing time is required, generally a stuffing speed (moving speed of the pushing member 40 or the like) is increased. In this case, however, the stuffing load will be increased as indicated by a solid line (a–α) in FIG. 29. Furthermore, the stuffing load is increased to exceed β point, and further increased at a steep angle as indicated by a two-dotted chain line γ, to exceed an upper limit Fu rapidly, so that the stuffing load will be too large to provide an appropriate working process.

The property of the two-dotted chain line as described above is resulted from the fact that the shock absorbent mat 3 is constituted by ceramic fibers, among which great amount of air is included. That is, with a rapid compression of the shock absorbent mat 3, the air included in the fibers has to be exhausted immediately through clearances among the fibers. However, the clearances among the fibers will not be expanded, instead, narrowed by compression of the fibers to act as orifices. Therefore, the air is compressed in the shock absorbent mat 3 to act as an air suspension, which increases the pressure as reaction force, thereby to increase the stuffing load to be excessive for a short time period.

According to the present embodiment, in view of the above, the stuffing speed will be reduced after the β point in FIG. 29, to set the maximum load as the value obtained at "c" point in FIG. 29, so that the cycle time will be shortened. At the outset, an ideal stuffing load curve (a-b-c-d-e) is recognized through a survey, and the stuffing speed faster than the curve, i.e., rapid increasing property (a–β) is provided, so that the substrate with the mat will be stuffed into the housing at that speed in the initial stage of stuffing process. This process is monitored by measuring the speed and load at least at α point. If an abnormal value was measured at the α point, the stuffing process would be terminated, otherwise the stuffing process would be continued until the β point. After the stuffing process was continued to reach the β point, the stuffing speed is reduced, and controlled to be merged into the regular stuffing load curve (c-d-e) before reaching the "c" point. Practically, a reducing control (curve) determined in advance through survey is set as a target, so that the stuffing speed is controlled. Through this speed control, the cycle time will be shortened by the amount resulted from the stuffing process performed at high speed in the initial stage.

As an alternative of the speed control as described above, the speed or load control may be performed in the stuffing process in accordance with a standard stuffing load curve (e.g., the curve (a-b-c-d-e) in FIG. 29). That is, the speed and load are monitored at "X" and "Y" points on the stuffing load curve (a-b-c-d-e), and it is determined whether the stuffing load curve is correct or not (i.e., gradient of the stuffing load curve is appropriate or not), on the basis of a variation between the two points. Then, if the gradient of the stuffing load curve is steep, the speed is reduced by the method as described above. On the contrary, if the gradient of the stuffing load curve is gentle, the stuffing speed is increased to raise the gradient, so as to approximate the stuffing load curve to become the regular stuffing load curve, around "c" point at last.

As another alternative of the speed control as described above, the variation between the "X" and "Y" points or the maximum load point "c" itself may be estimated. If those values were within a predetermined appropriate range, the stuffing process would be continued at the unchanged gradient. Or, if they are likely to exceed the appropriate range, the aforementioned control may be made so as to hold them within the appropriate range. Depending upon the accuracy to be required, the measurement may be made at either "X" point or "Y" point, or at the points equal to more than three points.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A method for producing a columnar member container for holding a columnar member in a cylindrical housing, comprising:
    wrapping a shock absorbent member around said columnar member;
    supporting one end portion of one of said cylindrical housing and said columnar member, on a support member;
    arranging the other one of said cylindrical housing and said columnar member in a cylindrical guide member formed with a tapered portion inside thereof and placed on the same axis as a longitudinal axis of said support member;
    inserting said shock absorbent member and said columnar member into said cylindrical housing through said tapered portion of said guide member;
    pressing a pushing member to the other one of said cylindrical housing and said columnar member so as to be moved along a longitudinal axis thereof relative to each other, to accommodate said shock absorbent member and said columnar member in said cylindrical housing;
    moving said support member and a shrinking mechanism for reducing a diameter of a part of said cylindrical housing, relative to each other, with the one end portion of one of said cylindrical housing and said columnar member being supported on said support member, to move said cylindrical housing, shock absorbent member and columnar member in a body, to be placed at a certain position relative to said shrinking mechanism; and
    actuating said shrinking mechanism to reduce the diameter of the part of said cylindrical housing.

2. The method of claim 1, wherein said support member and said shrinking mechanism are placed on a common axis face each other, and moved in a direction close to each other, to insert said shock absorbent member and said columnar member into said cylindrical housing, and reduce the diameter of said cylindrical housing, in sequence.

3. The method of claim 2, wherein said guide member is retracted from a path for inserting said shock absorbent member and said columnar member into said cylindrical housing, after said shock absorbent member and said columnar member were inserted into said cylindrical housing.

4. The method of claim 3, wherein said shrinking mechanism includes a plurality of segments to provide a tapered outer peripheral surface, and at least a clamping member having a tapered inner peripheral surface to slide in contact with the tapered outer peripheral surface of said segments, and wherein said clamping member is moved along the longitudinal axis of said cylindrical housing, to actuate said segments in a radial direction toward the longitudinal axis of said cylindrical housing.

5. The method of claim 1, wherein said guide member is retracted from a path for inserting said shock absorbent member and said columnar member into said cylindrical housing, after said shock absorbent member and said columnar member were inserted into said cylindrical housing.

6. The method of claims 1, wherein said shrinking mechanism includes a plurality of segments to provide a tapered outer peripheral surface, and at least a clamping member having a tapered inner peripheral surface to slide in contact with the tapered outer peripheral surface of said segments, and wherein said clamping member is moved along the longitudinal axis of said cylindrical housing, to actuate said segments in a radial direction toward the longitudinal axis of said cylindrical housing.

7. A method for producing a columnar member container for holding at least two columnar members in a cylindrical housing, comprising:
    wrapping shock absorbent members around said columnar members, respectively;
    supporting one end portion of said cylindrical housing on a support member;
    arranging a first columnar member in a cylindrical guide member formed with a tapered portion inside thereof and placed on the same axis as a longitudinal axis of said support member;
    inserting said first columnar member and a first shock absorbent member wrapped around said first columnar member, into said cylindrical housing through said tapered portion of said guide member;
    pressing a pushing member to said first columnar member so as to be moved along a longitudinal axis thereof relative to said cylindrical housing, to accommodate said first shock absorbent member and said first columnar member in said cylindrical housing;
    moving said support member and a shrinking mechanism for reducing a diameter of a first part of said cylindrical housing, relative to each other, with the one end portion of said cylindrical housing being supported on said support member, to move said cylindrical housing, first shock absorbent member and first columnar member in a body, to be placed at a first position relative to said shrinking mechanism;
    actuating said shrinking mechanism to reduce the diameter of the first part of said cylindrical housing;
    arranging a second columnar member in said cylindrical guide member;
    inserting said second columnar member and a second shock absorbent member wrapped around said second columnar member, into said cylindrical housing through said tapered portion of said guide member;
    pressing said pushing member to said second columnar member so as to be moved along a longitudinal axis thereof relative to said cylindrical housing, to accommodate said second shock absorbent member and said second columnar member in said cylindrical housing;
    moving said support member and said shrinking mechanism relative to each other, with the one end portion of said cylindrical housing being supported on said support member, to move said cylindrical housing to be placed at a second position relative to said shrinking mechanism; and
    actuating said shrinking mechanism to reduce the diameter of a second part of said cylindrical housing spaced from the first part thereof by a certain longitudinal length.

8. The method of claims 7, wherein said shrinking mechanism includes a plurality of segments to provide a tapered outer peripheral surface, and at least a clamping member having a tapered inner peripheral surface to slide in contact with the tapered outer peripheral surface of said segments, and wherein said clamping member is moved along the longitudinal axis of said cylindrical housing, to actuate said segments in a radial direction toward the longitudinal axis of said cylindrical housing.

9. The method of claims 8, wherein said clamping member has a curved surface formed at an inner end portion thereof to be opened outward, along an opening end of said clamping member.

10. The method of claims 9, wherein said second columnar member is smaller in diameter than said first columnar member.

* * * * *